(12) United States Patent
Avshalomov et al.

(10) Patent No.: US 11,256,873 B2
(45) Date of Patent: Feb. 22, 2022

(54) DATA PROCESSING SYSTEM AND METHOD FOR DYNAMIC ASSESSMENT, CLASSIFICATION, AND DELIVERY OF ADAPTIVE PERSONALIZED RECOMMENDATIONS

(71) Applicant: ReUp Education, Inc., San Francisco, CA (US)

(72) Inventors: Zachary Aaron Avshalomov, Oakland, CA (US); Kathryn Clune VanVliet, LaGrange, IL (US); Sarah Horn, Toledo, OH (US)

(73) Assignee: ReUp Education, Inc., San Francisco, CA (US)

( * ) Notice: Subject to any disclaimer, the term of this patent is extended or adjusted under 35 U.S.C. 154(b) by 0 days.

(21) Appl. No.: 17/244,818

(22) Filed: Apr. 29, 2021

(65) Prior Publication Data

US 2021/0342545 A1 Nov. 4, 2021

Related U.S. Application Data

(60) Provisional application No. 63/019,300, filed on May 2, 2020.

(51) Int. Cl.
*G06F 16/28* (2019.01)
*G06F 40/30* (2020.01)
(Continued)

(52) U.S. Cl.
CPC ............ *G06F 40/30* (2020.01); *G06F 16/248* (2019.01); *G06F 16/2457* (2019.01);
(Continued)

(58) Field of Classification Search
CPC .. G06F 40/30; G06F 16/285; G06F 16/24522; G06F 16/2457; G06F 16/248; G06G 40/284
See application file for complete search history.

(56) References Cited

U.S. PATENT DOCUMENTS

| 9,667,367 B2 | 5/2017 | Swayambhu et al. |
| 2017/0024656 A1* | 1/2017 | Gilon .................... G16H 10/60 |
| 2019/0080799 A1 | 3/2019 | Galuten |

FOREIGN PATENT DOCUMENTS

KR    10-1926620    12/2018

OTHER PUBLICATIONS

Judith M. Haracktewicz and Stacy J. Priniski, Improving Student Outcomes in Higher Education: The Science of Targeted Intervention Annual Rev Psychol. Jan. 4, 2018; 69: 409-435; https://www.ncbi.nlm.nih.gov/pmc/articles/PMC6211287/pdf/nihms-991453.pdf (accessed Jan. 23, 2020).

(Continued)

*Primary Examiner* — Truong V Vo
(74) *Attorney, Agent, or Firm* — Constance F. Ramos

(57) ABSTRACT

A data processing system and method for delivering a personalized recommendation to an individual, using computerized, dynamic assessment and classification of communication interaction records, is described. The system and method comprises a machine learning application to (1) classify a persona based on communication processing of communication interaction records captured over time, and (2) generate an adaptive personalized recommendation for use within a coaching, advisory or other personalized service. The system and method allows for improved assessments and identification of factors affecting achievement of a goal or outcome, thereby allowing for adaptive, personalized recommendations, improving delivery of personalized support services, and improved success rates for achieving a defined outcome. The system and method may also be used to create a collection of persona analytics information that may be used to visualize and evaluate trends associated with an individual or within a given population.

25 Claims, 22 Drawing Sheets

(51) Int. Cl.
  *G06F 40/284* (2020.01)
  *G06F 16/2452* (2019.01)
  *G06F 16/248* (2019.01)
  *G06F 16/2457* (2019.01)
(52) U.S. Cl.
  CPC ...... *G06F 16/24522* (2019.01); *G06F 16/285* (2019.01); *G06F 40/284* (2020.01)

(56) References Cited

OTHER PUBLICATIONS

Cloud Speech-to-Text, https://cloud.google.com/speech-to-text/ (accessed Jan. 21, 2020).
Separating different speakers in an audio recording, https://cloud.google.com/speech-to-text/docs/multiple-voices (accessed Jan. 21, 2020).
SpaCy 101: Everything you need to know, https://spacy.io/usage/spacy-101 (accessed Jan. 21, 2020).
ClausIE: Clause-Based Open Information Extraction, https://www.mpi-inf.mpg.de/departments/databases-and-information-systems/software/clausie/ (accessed Jan. 21, 2020).
Cloud Natural Language AI, https://cloud.google.com/natural-language/ (accessed Jan. 21, 2020).
Topic Modeling, https://docs.aws.amazon.com/comprehend/latest/dg/topic-modeling.html (accessed Jan. 21, 2020).
S. Asiri, Machine Learning Classifiers, https://towardsdatascience.com/machine-learning-classifiers-a5cc4e1b0623 (Jun. 11, 2018).
Guide to Aspect-Based Sentiment Analysis, https://monkeylearn.com/blog/aspect-based-sentiment-analysis/ (accessed Jan. 21, 2020).
J. Devlin and M-W Chang, Open Sourcing BERT: State-of-the-Art Pre-training for Natural Language Processing, Nov. 2, 2018, https://ai.googleblog.com/2018/11/open-sourcing-bert-state-of-art-pre.html) (accessed Jan. 21, 2020).
S. Asiri, Smaller, faster, cheaper, lighter: Introducing DistilBERT, a distilled version of BERT, Aug. 28, 2019, https://medium.com/huggingface.distilbert-8cf3380435b5.
Jakob Uszkorei, Transformer: A Novel Neural Network Architecture for Language Understanding, Aug. 31, 2017, https://ai.googleblog.com/2017/08/transformer-novel-neural-network.html) (accessed Jan. 21, 2020).
Personality Types, https://www.16personalities.com/personality-types (accessed Jan. 21, 2020).
What is DiSC?, https://www.discprofle.com/what-is-disc/overview/ (accessed Jan. 21, 2020).
Learn How the CliftonStrengths Assessment Works, https://www.gallup.com/cliftonstrengths/en/253676/how-cliftonstrengths-works.aspx (accessed Jan. 21, 2020).
How Netflix's Recommendations System Works, https://help.netflix.com/en/node/100639 (accessed Jan. 23, 2020).
Carmine Savoia, et al., Personalized Medicine—A Modern Approach For The Diagnosis and Management of Hypertension, Nov. 6, 2017, Clinical Science 131 2671-2685; https://doi.org/10.1042/CS20160407; https://www.ncbi.nlm.nih.gov/pmc/articles/PMC5736921/ (accessed Jan. 23, 2020).
What About the Words? Natural Language Processing in Psychotherapy, https://societyforpsychotherapy.org/words-natural-language-processing-psychotherapy/ (accessed Jan. 23, 2020).
Seyedmostafa Sheikhalishahi, et al., Natural Language Processing of Clinical Notes on Chronic Diseases: Systematic Review, JMIR Med Inform., Apr. 27, 2019;7(2); https//www.ncbi.nlm.nih.gov/pubmed/31066697 (accessed Jan. 23, 2020).
Jessica Kent, 4 Natural Language Processing Use Cases for Healthcare Orgs, Jul. 24, 2018, https://healthitanalytics.com/news/4-natural-language-processing-use-cases-for-healthcare-orgs) (accessed Jan. 23, 2020).
PCT International Search Report (PCT/ISA/210), dated Sep. 29, 2021.
PCT Written Opinion of the International Search Authority (PCT/ISA/237), dated Sep. 29, 2021.

\* cited by examiner

|  | Dimension 1 | Dimension 2 | Dimension 3 | Dimension 4 |
|---|---|---|---|---|
| Assessment Categories *136c* | Enabling | Enabling | Enabling | Enabling |
|  | Inhibiting | Inhibiting | Inhibiting | Inhibiting |

*136b* indicates the dimensions row. *136* indicates the overall table.

FIG. 3A

| Persona Classifications *138* | Dimension 1 | Dimension 2 | Dimension 3 | Dimension 4 |
|---|---|---|---|---|
| Persona 1 *138-1* | Enabling *136c-1* | Enabling | Enabling | Enabling |
| Persona 2 *138-2* | Enabling | Enabling | Enabling | Inhibiting *136c-2* |
| Persona 3 *138-3* | Enabling | Enabling | Inhibiting | Enabling |
| Persona 4 | Enabling | Inhibiting | Enabling | Enabling |
| Persona 5 | Inhibiting | Enabling | Enabling | Enabling |
| Persona 6 | Enabling | Enabling | Inhibiting | Inhibiting |
| Persona 7 | Enabling | Inhibiting | Enabling | Inhibiting |
| Persona 8 | Enabling | Inhibiting | Inhibiting | Enabling |
| Persona 9 | Inhibiting | Enabling | Enabling | Inhibiting |
| Persona 10 | Inhibiting | Enabling | Inhibiting | Enabling |
| Persona 11 | Inhibiting | Inhibiting | Enabling | Enabling |
| Persona 12 | Enabling | Inhibiting | Inhibiting | Inhibiting |
| Persona 13 | Inhibiting | Enabling | Inhibiting | Inhibiting |
| Persona 14 | Inhibiting | Inhibiting | Enabling | Inhibiting |
| Persona 15 | Inhibiting | Inhibiting | Inhibiting | Enabling |
| Persona 16 | Inhibiting | Inhibiting | Inhibiting | Inhibiting |

Set of dimensions *136b*

FIG. 3B

Basic Modular:

Intermediate Modular:

FIG. 5C

Sophia Kent

| Reason Removed from Pipeline ⊙ | Retention Coach ⊙ |
| Reason Not Interested ⊙ | Re-entry Coach ⊙ |
| COMM Plan ⊙ | |

∨ Coaching Spheres — 506

| Student: Self ⊙ Low | Student: External ⊙ Medium |
| Student: University ⊙ High | Student: Coach ⊙ Low |

∨ Support Plan

| | | | |
|---|---|---|---|
| S: Self | *Uncertain* | (1) | Focus on normalizing student experience and building self-confidence |
| S: University | *Promoting* | (5) | Positively reinforce continued student engagement with faculty & peers |
| S: External | *Supported* | (3) | Help student identify additional support resources outside of school |
| S: Coach | *Reluctant* | (1) | Educate around the purpose and value of success coaching |

506a — 516 — 517 — 519

+ Follow | Edit | Delete | Schedule Meeting — 530

Persona: UPSR - (Seeker)

Measure
■ Sum of S: Self
□ Sum of S: Univers...
▦ Sum of S: External
▨ Sum of S: Coach (bar chart, values 0–5) — 517'

Sum of S: Self, Sum of S: University, Su...

View Report    As of Today at 9:22 PM ↻ — 510

*Seekers struggle with low confidence and are hesitant to receive support from a coach, but are eager to complete and often well supported.*

515

| Self | Coach | External | School | Student % | Enrollment % |
|---|---|---|---|---|---|
| N | — | — | N | 16% | 8% |
| E | — | — | E | 16% | 33% |
| — | — | — | — | 13% | 27% |
| — | — | — | E | 11% | 27% |
| N | N | — | N | 6% | 14% |
| E | — | — | N | 6% | 5% |
| — | — | — | N | 6% | 10% |
| E | — | — | — | 5% | 32% |
| N | — | — | E | 3% | 13% |
| E | E | — | E | 2% | 35% |

FIG. 5I

|  | S: Self | S: University | S: External | S: Coach |
|---|---|---|---|---|
| Enabling (+) | Confident | Promoting | Supported | Engaged |
| Inhibiting (−) | Uncertain | Skeptical | Isolated | Reluctant |

136b (columns), 136c (rows)

|  | DIMENSION | | | |
| --- | --- | --- | --- | --- |
| PERSONA | Self | University | External | Coach |
| Persona 1 | Confident | Promoting | Supported | Engaged |
| Persona 2 | Confident | Promoting | Supported | Reluctant |
| Persona 3 | Confident | Promoting | Isolated | Engaged |
| Persona 4 | Confident | Skeptical | Supported | Engaged |
| Persona 5 | Uncertain | Promoting | Supported | Engaged |
| Persona 6 | Confident | Promoting | Isolated | Reluctant |
| Persona 7 | Confident | Skeptical | Supported | Reluctant |
| Persona 8 | Confident | Skeptical | Isolated | Engaged |
| Persona 9 | Uncertain | Promoting | Supported | Reluctant |
| Persona 10 | Uncertain | Promoting | Isolated | Engaged |
| Persona 11 | Uncertain | Skeptical | Supported | Engaged |
| Persona 12 | Confident | Skeptical | Isolated | Reluctant |
| Persona 13 | Uncertain | Promoting | Isolated | Reluctant |
| Persona 14 | Uncertain | Skeptical | Supported | Reluctant |
| Persona 15 | Uncertain | Skeptical | Isolated | Engaged |
| Persona 16 | Uncertain | Skeptical | Isolated | Reluctant |

|        | Confident |      |      |      |
|--------|-----------|------|------|------|
| Enabling | CPSE | CPSR | CKSE | CKSR |
|        | CPIE | CPIR | CKIE | CKIR |
| Promoting | UPSE | UPSR | UKSE | UKSR | Skeptical
|        | UPIE | UPIR | UKIE | UKIR |
|        | Uncertain |      |      | Inhibiting |

*FIG. 9D*

DATA PROCESSING SYSTEM AND METHOD FOR DYNAMIC ASSESSMENT, CLASSIFICATION, AND DELIVERY OF ADAPTIVE PERSONALIZED RECOMMENDATIONS

CROSS-REFERENCE TO RELATED APPLICATIONS

This application claims the benefit of U.S. Provisional Patent Application No. 63/019,300 titled "Dynamic Assessment and Classification System for Delivering Adaptive Personalized Recommendations Using Natural Language Processing and Machine Learning," filed May 2, 2020, which is hereby incorporated herein by reference in its entirety for all purposes.

BACKGROUND

Technological Field

The present application relates generally to an improved data processing system and method and, more specifically, to mechanisms for providing personalized recommendations using computer-implemented communication processing algorithms, such as natural language processing algorithms.

Description of Related Art

Some background technologies have been described as providing disjoint information and data processing methods in a variety of previously unrelated applications. For example, in the areas of natural language processing (NLP) and natural language understanding (NLU), relevant machine learning technology includes:
1) Call transcription (speech to text) (https://cloud.google.com/speech-to-text/)
2) Call diarization (https://cloud.google.com/speech-to-text/docs/multiple-voices)
3) Text processing (https://spacy.io/usage/spacy-101)
4) Keyphrase and clause extraction (https://www.mpi-inf.mpg.de/departments/databases-and-information-systems/software/clausie/)
5) Sentiment analysis (https://cloud.google.com/natural-language/)
6) Topic modeling (https://docs.aws.amazon.com/comprehend/latest/dg/topic-modeling.html)
7) Classifiers (https://towardsdatascience.com/machine-learning-classifiers-a5cc4e1b0623)
8) Aspect-based sentiment analysis (https://monkeylearn.com/blog/aspect-based-sentiment-analysis/)
9) Bi-directional pretraining (Google BERT) (https://ai.googleblog.com/2018/11/open-sourcing-bert-state-of-art-pre.html)
10) DistilBERT (https//medium.com/huggingface/distilbert-8cf3380435b5)
11) Transformers (https://ai.googleblog.com/2017/08/transformer-novel-neural-network.html)

Separate and apart from the above, studies and applications pertaining to identification and evaluation of personality and personas have been documented, as for example: Myers-Briggs (https://www.16personalities.com/personality-types); DiSC Profiles (https://www.discprofile.com/what-is-disc/overview/); and Clifton StrengthsFinder (https://www.gallup.com/cliftonstrengths/en/253676/how-cliftonstrengths-works.aspx). Additionally, techniques described as providing personalized recommendations and interventions include: (i) Interventions in Higher Education (https://www.ncbi.nlm.nih.gov/pmc/articles/PMC6211287/pdf/nihms-991453.pdf); Netflix's Recommendation Engine (https://help.netflix.com/en/node/100639); and personalized medicine (https://www.ncbi.nlm.nih.gov/pmc/articles/PMC5736921/).

While experimentation with NLP has been documented in areas of psychology (https://societyforpsychotherapy.org/words-natural-language-processing-psychotherapy/) and medicine (https://www.ncbi.nlm.nih.gov/pubmed/31066697; https://healthitanalytics.com/news/4-natural-language-processing-use-cases-for-healthcare-orgs), an unfulfilled need exists for reliable, effective, and dynamically adaptable personalization of intervention and recommendation services—especially on a large scale. Personalized service typically comes at the cost of increased human effort, and such effort is not scalable or entirely reliable with prior systems and methods. From customer support, to crisis hotlines, to therapy, to medicine, to advising, to coaching, to mentoring, to counseling and beyond, the disjoint and various prior art systems and methods described above are unable to provide comprehensive, reliable, and adaptive personal interventions, recommendations, or other advisory services, both dynamically and on a large scale.

SUMMARY

In order to improve on the prior art, a dynamic assessment and classification system for delivering personalized recommendations using persona classifications, natural language processing, and machine learning is described. The system and method described herein is operable to provide comprehensive, reliable, adaptive and scalable personal interventions, recommendations, and/or other advisory services, dynamically, in a wide variety of use cases and applications.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

One general aspect of the system described herein includes a data processing system to determine a personalized recommendation from communication interaction records, where the data processing system includes a computer-readable storage medium having a non-transitory computer readable program stored therein, where the non-transitory computer readable program, when executed on a computing device of the data processing system, causes the computing device to: (1) retrieve an interaction record from a database; (2) extract one or more passages from the interaction record, using a natural language processing algorithm; (3) classify the one or more passages according to one or more dimensions, so as to create at least one dimension-labeled passage; (4) determine at least one scored passage associated with the at least one dimension-labeled passage; (5) obtain at least one assessed dimension based upon the at least one scored passage; (6) use the at least one assessed dimension to identify a persona classification associated with the interaction record, so as to obtain a classified persona; and (7) determine at least one intervention recommendation from a plurality of recommendations relating to an outcome, based upon the classified persona and the at least one assessed dimension. Other embodiments of this aspect include corresponding computer systems, apparatus, and computer programs recorded on one or more computer storage devices, each configured to perform the above actions.

Another general aspect of the subject matter described herein includes a method for providing a personalized intervention recommendation based upon persona classifications and stored communication interaction records. Communication interaction records may include verbal and/or nonverbal communication information. In this general aspect, the method includes: (1) defining a set of one or more dimensions correlated with an outcome using a data processing system, where the data processing system includes a database of stored communication interaction records; and within the data processing system, (2) defining a plurality of recommendations relating to the set of one or more dimensions; (3) retrieving an interaction record from the database, (4) extracting one or more passages from the interaction record using a natural language processing algorithm, (5) classifying the one or more passages according to the set of one or more dimensions, to create at least one dimension-labeled passage, (6) determining a scored passage associated with the at least one dimension-labeled passage, (7) obtaining at least one assessed dimension based upon the scored passage, (8) using the at least one assessed dimension to identify a persona classification associated with the interaction record, to obtain a classified persona, (9) matching the at least one assessed dimension to at least one intervention recommendation identified from the plurality of recommendations relating to the outcome and based upon the classified persona, and (10) storing the classified passage, the at least one assessed dimension, the classified persona, and the at least one intervention recommendation along with persona analytics information in the database; (11) communicating the persona analytics information to an output hardware device of the data processing system. Other embodiments of this aspect include corresponding computer systems, apparatus, and computer programs recorded on one or more computer storage devices, each configured to perform the actions of the method.

Implementations may include the above method where the steps of retrieving, extracting, classifying, determining, obtaining, using, matching and storing are repeated dynamically over time. The persona analytics information may optionally be stored in a data warehouse of persona analytics information and collectively accessed to evaluate trends for an individual or population. Implementations of the described techniques may include hardware, a method or process, or computer software on a computer-accessible medium.

In yet another aspect, a data processing system of the present subject matter may include a data processing system to classify, dynamically from a communication interaction record, a persona and a recommendation associated with that persona, the data processing system comprising: (1) a database operable to store one or more records of at least one communication interaction, as captured through one or more communication channels; (2) a computer processor operable to process, using a natural language processor, the one or more records of the at least one communication interaction, so as to identify a persona classification associated with at least one individual and to generate at least one personal recommendation associated with that persona and individual; and (3) an output device informationally coupled to the computer processor and the database, and operable to present information relating to a set of (i.e., one or more) persona analytics information associated with the at least one individual. Other embodiments of this aspect include corresponding computer systems, apparatus, and computer programs recorded on one or more computer storage devices, each configured to perform the actions of the methods.

One general aspect of the data processing system described herein includes computerized means for assessing a dimension correlated with an outcome, based on communication interaction records; computerized means for classifying a persona based on the assessed dimension(s), and computerized means for providing a recommendation corresponding to the assessed dimension(s) and classified persona. Embodiments of this aspect include corresponding computer systems, apparatus, and computer programs recorded on one or more computer storage devices, each configured to perform the actions of the methods described herein.

By way of example, in one aspect, the system and method described herein may be applied to assess dimensions in a student's life that enable or inhibit success in returning to and completing school. Using the system and method described herein, assessments may be made dynamically over time, based on what a student says (in natural language) and does (through interactions), which allows the student to then be classified into one of sixteen data-driven personas. In this aspect, based on that classified persona, the system and method is implemented to provide personalized intervention recommendations expected to be effective in helping the student achieve positive outcomes, e.g., completing a degree objective.

More generally, the system and method described herein assesses one or more dimensions about an individual which enable or inhibit attaining one or more specific outcomes. These assessments may be made dynamically over time, by way of one or more natural language algorithms and/or described nonverbal interactions based on what an individual says and does, which allow the individual to then be classified into a data-driven persona. In this general aspect, based on the data-driven persona classification, specific interventions are recommended that may be expected to be effective in helping the individual achieve or avoid said specific outcomes.

BRIEF DESCRIPTION OF THE DRAWINGS

FIG. 3A depicts one exemplary aspect wherein a persona classification is based on an example case comprising four dimensions to be assessed, and wherein a given dimension has either an enabling or inhibiting (positive or negative) potential and a mutually exclusive assessment category.

FIG. 3B illustrates how the exemplary aspect of FIG. 3A defines sixteen possible persona classifications, and wherein a given persona is identified by one of sixteen assessed dimension permutations for the four identified dimensions.

FIGS. 5A, 5B, 5C, 5D, 5E, 5F, 5G, 5H, and 5I illustrate several different examples of front-end application presentation formats of persona analytics information, as displayed on a graphical user interface for some aspects of the present subject matter.

FIG. 7A shows hardware schematics, while FIG. 7B shows an exemplary algorithm executed by the computer system in some aspects of the present subject matter.

FIGS. 9A, 9B, 9C and 9D illustrate a use case of the present system and method as used in an exemplary application of educational re-entry coaching.

DETAILED DESCRIPTION

The present subject matter relates to both a system and an associated method. In one aspect, the system comprises the following structural components: (1) a set of (i.e., one or more) interaction records for individuals, representatives, and the interactions between them (both verbal and nonverbal), as captured through at least one communication channel (such as email, chat, or phone); (2) a database (or data warehouse), used to store the interaction records, among other information; (3) a back-end processor, which, when in operation, includes an application that processes the stored interaction records to generate assessments, personas, recommendations, and ancillary analytic metrics, which are then stored back in the database (or data warehouse); and (4) a front-end application, which may optionally include graphical user interfaces used to visually present information derived from the back-end application processing, and to conduct further analysis of that information. The graphical user interfaces can be used by representatives to aid in the provision of personalized service to the individuals, as described in more detail below. As used herein, a representative may be another individual, a coach, a counselor, an advisor or analyst, or a chatbot or other form of artificial intelligence system, or even the individuals themselves in a self-service operation of the system described herein.

Figure 1A:
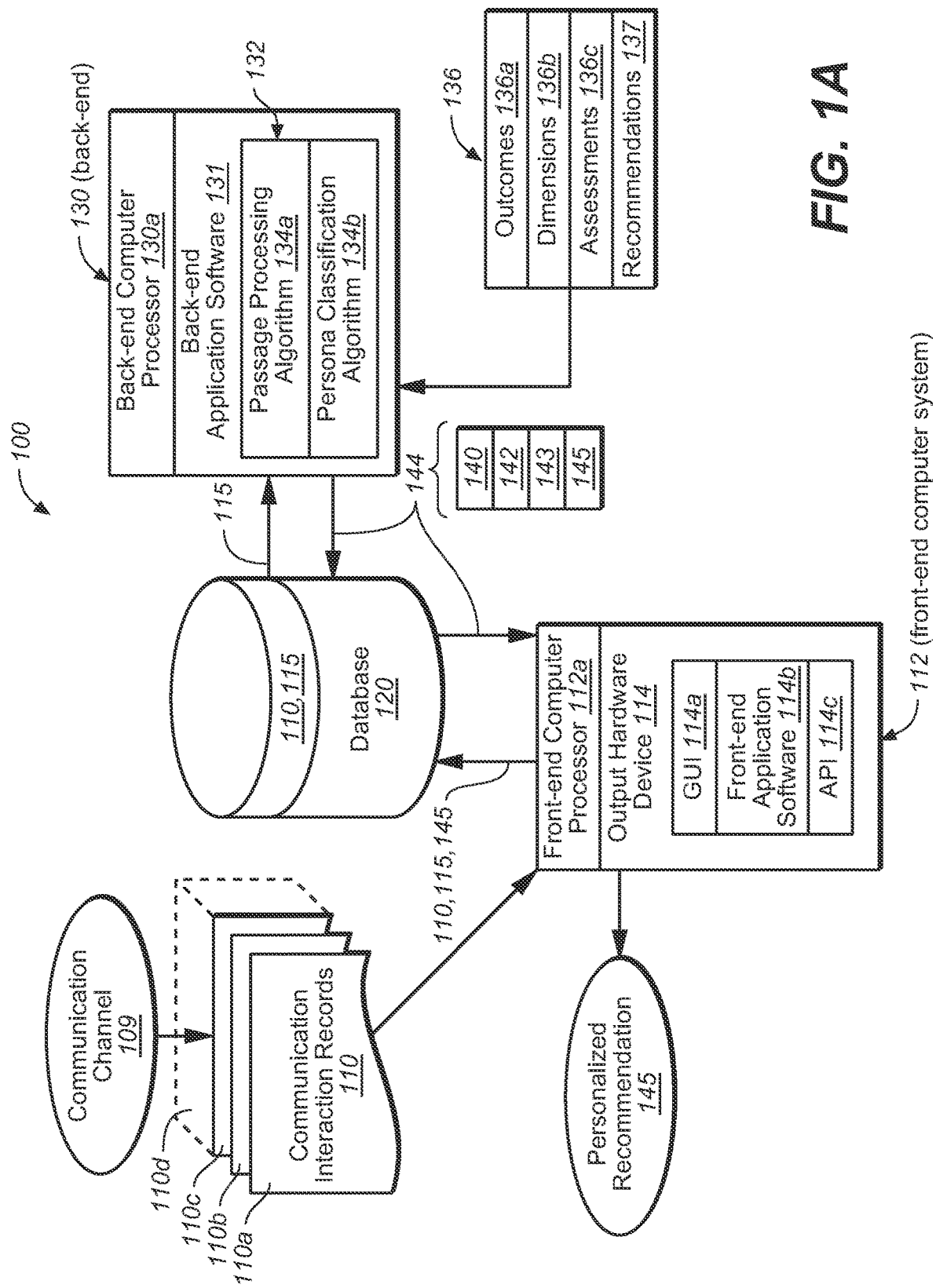
FIG. 1A shows a schematic diagram describing one aspect of a general architecture of the system utilizing a front-end application programming interface and a back-end data processing system.

FIG. 1A shows a schematic diagram describing a general architecture that may be used for one aspect of a data processing system 100 for dynamic assessment and classification method for delivering adaptive personalized recommendations. In this aspect, one or more communication channels 109 capture a set of communication interaction records 110, which may comprise various forms (such as, for example, email records 110a, voice recordings 110b, form submissions 110c, etc . . . ). A front-end computer system 112 comprises a front-end computer processor 112a and an output hardware device 114, which further comprises a front-end application graphical user interface (GUI) 114a, front-end application software 114b, and a front-end application programming interface (API) 114c. Front-end computer system 112 processes the set of communication interaction records 110, thereby generating a set of stored communication interaction records 115 (comprising a set of one or more passages 117), which are then stored by front-end API 114c of front-end application software 114b (executing on front-end computer processor 112a) in a database 120. Database 120 is further accessed by a back-end data processing system 130, comprising a back-end computer processor 130a executing back-end application software 131, which further comprises a communication processing algorithm 132 (such as, e.g., a natural language processing algorithm). Communication processing algorithm 132 further comprises (1) a passage processing algorithm 134a and (2) a persona classification algorithm 134b.

In the aspect shown in FIG. 1A, back-end application software 131, when executing on back-end data processing system 130, is operable to determine a set of personal recommendations based upon the following inputs:

(a) stored communication interaction record(s) 115;

(b) a data structure 136 comprising (i) defined set of (one or more) outcomes 136a, (ii) a defined set of dimensions 136b correlated with the outcome(s) 136a, and (iii) a defined set of possible assessment categories 136c for the set of dimensions 136b; and (c) a defined plurality of recommendations 137 (for example, possible interventions) relating to various combinations and permutations of possible assessment categories 136c.

Using this input information, combinations and permutations of possible assessment categories 136c defines a plurality of persona classifications 138 (not shown in FIG. 1A; further discussed below). Back-end application software 131 determines a set of one or more personalized recommendations by:

(1) retrieving one or more stored communication interaction records 115 from database 120;

(2) extracting a set of one or more passages 117 from the (one or more) stored communication interaction record(s) 115;

(3) using communication processing algorithm 132 (such as a natural language processing algorithm) to obtain a set of assessed dimensions 140 associated with passage(s) 117;

(4) using the assessed dimension(s) 140 to identify a persona classification 141, so as to obtain a classified persona 142; and (5) determining a set of personal recommendations 143 based upon classified persona 142 and assessed dimension(s) 140.

In a further aspect, back-end data processing system 130 derives a set of persona analytics information 144, e.g., passage(s) 117, assessed dimension(s) 140, classified persona 142, personal recommendation(s) 143, and ancillary metrics (for example, date time stamps, a health quotient, persona acronyms and related "brand names", counts of communication interactions records 110 and passages 117, and other information as further described below), and then stores persona analytics information 144 in database 120 for later retrieval and further processing, analysis, display, and/or use in delivering at least one personalized recommendation 145 to a beneficiary of data processing system 100.

Thus, in one aspect, general inputs, processing, and outputs of a method associated with the system of FIG. 1A are shown in Table I below.

TABLE I

| INPUTS | PROCESSING | OUTPUTS |
|---|---|---|
| A set of Communication Interaction Records 110 (from various text and voice sources such as email records 110a, voice recordings 110b, form submissions 110c, video recordings, SMS, chat communications, etc . . .) | Front-End Application Software 114b | Stored Communication Interaction Records 115 stored in database 120, associated with individuals and representatives, with metadata based on (for example) the type of interaction, its originating communication channel (from a set of communication channels 109), date and time |
| Stored Communication Interaction Records 115 (as retrieved from database 120) | Communication Processing Algorithm 132 (e.g., natural language processing) comprising Passage Processing Algorithm 134a and Persona Classification Algorithm 134b (via Back-end Application Software 131) | Persona Analytics Information 144 per individual (e.g., passages 117, assessed dimensions 140, classified persona 142, set of personal recommendations 143, personalized recommendation 145, and ancillary metrics), stored in and retrieved from database 120 |
| Persona Analytics Information 144 | Front-End Application GUI 114a | Visualization graphics and information for facilitating delivery of a personalized recommendation 145 (e.g., an intervention), for example, by a representative, including real-time delivery in some aspects (e.g., during interactions with an individual being served, or by an individual as a self-service) |

In one aspect, in addition to stored communication interaction records 115, database 120 is also operable to store, per individual: (1) interaction metadata; (2) diarized, transcribed voice transcriptions; (3) preprocessed text; (4) segmented/extracted text passages with labels and scores; and (5) timestamped outputs of persona analyses generated by the back-end application.

1. Back-End Application

In one general aspect, the main technologies employed to derive persona analytics information from stored interaction records (beyond basic text preprocessing, transcription, diarization, extraction, data storage and data transfer) are custom-trained classifier models developed through, for example, supervised learning. Speaker identification, dimension identification, and dimension scoring are such custom classifiers. Unsupervised approaches may also be used to identify viable dimensions. Bi-directional network architectures and language model pre-training may further improve model performance. It should be recognized that any approach to classification, however, may be used within the system and method described herein, in order for the system to achieve its objectives of comprehensive, reliable, adaptive and scalable personal intervention, recommendation, or other advisory services, which represent improvements over prior art systems.

In this general aspect, once an individual's persona analytics information is generated by the system, an assessed dimension can be matched against a bank of interventions to create service recommendations for the individual.

Figure 1B:
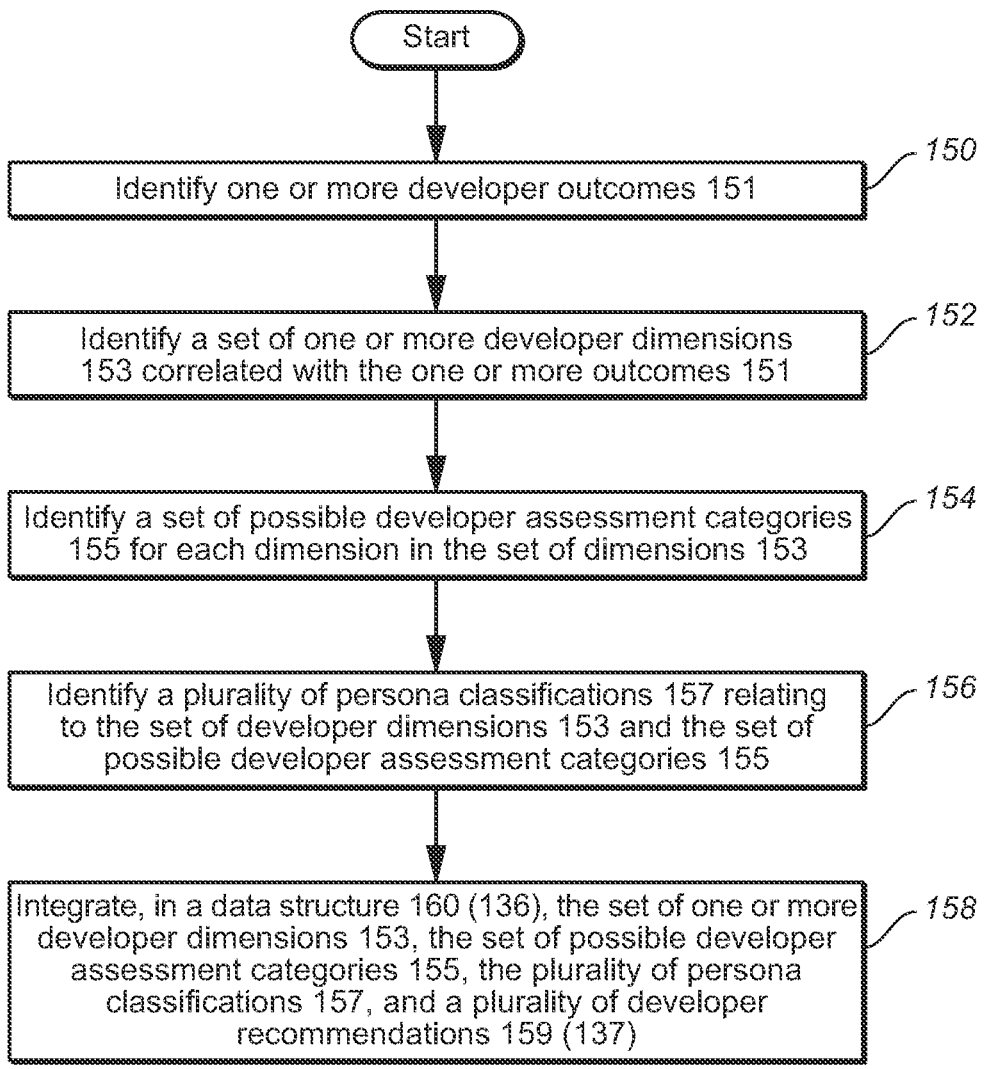
FIG. 1B shows a flowchart for one aspect of a method for determining input information used by the back-end application depicted in FIG. 1A.

FIG. 1B shows a flowchart for one general aspect of a method comprising an initial "developer" stage that includes identification of one or more outcomes 151 (or goals) and sets of (1) one or more developer dimensions 153 and (2) possible developer assessment categories 155, to be used for defining a plurality of developer persona classifications 157 and a plurality of developer recommendations 159, comprising:

(step 150) identifying a set of one or more developer outcomes 151;

(step 152) identifying a set of one or more developer dimensions 153 correlated with the one of more developer outcomes 151;

(step 154) identifying a set of possible developer assessment categories 155 for each developer dimension in the set of developer dimensions 153;

(step 156) identifying a plurality of developer persona classifications 157 and relating to the set of developer dimensions 153 and the set of possible developer assessment categories 155; and (step 158) integrating, in a data structure 160, the set of one or more developer dimensions 153, the set of possible developer assessment categories 155, the plurality of developer persona classifications 157 and a plurality of developer recommendations 159.

Developer dimension(s) 153 and persona classification(s) 157 together define a meaningful relationship with an identified outcome 151 (or goal) within a given use case—for example, student coaching for educational success. A minimum of at least one dimension is identified and assessed for any given individual (generating two persona permutations); however, there is no maximum to the number of dimensions, persona classifications, or interventions/recommendations that are possible using this method.

As further detailed below, in one aspect, a computerized developer platform comprising a second data processing system 600 may be used to perform the methods comprising the above steps 150, 152, 154, 156 and 158, wherein the sets of outcomes 151, developer dimensions 153, possible developer assessment categories 155, and the plurality of developer recommendations 159 and the plurality of developer persona classifications 157, are first identified, and then integrated into data structure 136 (FIG. 1A), so as to define, in back-end data processing system 130, the set of outcomes 136a, the set of one or more dimensions 136b, the set of possible assessment categories 136c, the plurality of recommendations 137, and the plurality of persona classifications 138 used by back-end application software 131 (FIG. 1A).

Integrating the initial "developer" stage depicted in FIG. 1B with the system depicted in FIG. 1A comprises executing an Integration Process (as further described below).

Generally, the system and method of the present subject matter provides a dynamic assessment and classification tool for delivering adaptive, personalized recommendations to an individual or representative, by incorporating natural language processing and machine learning aspects. Individuals and/or representatives of individuals may use the dimension assessments and personas identified and classified by the system to holistically understand the factors affecting an individual's attainment (or avoidance) of one or more outcomes, or achievement of goals. This understanding, along with specific intervention recommendations matched by the system, allows representatives to deliver effective and personalized support to individuals they serve through in-person, email, phone, video, and/or SMS/chat interactions, thereby avoiding the necessity to make assessments and determine recommended interventions themselves.

By way of practical example and illustration, one use case involves coaching or advising students for educational success. Educational coaches may use dimension assessments and personas analytics information determined by the system and method described herein, to holistically understand a student's strengths and challenge areas affecting their return to school (and degree completion). This understanding, along with specific intervention recommendations provided by the system and method, allow coaches to deliver effective and personalized support to students they serve through email, phone, and/or SMS/chat interactions, thereby avoiding the necessity to make assessments and determine effective support plans themselves.

Other use cases or applications may include:

1. Customer Support: A customer support agent (human or artificial intelligence) communicates with a customer as they are considering purchasing a product or service. As the conversation progresses (across one or more exchanges and over one or more communication channel, such as email, chat, or phone), the system and method described herein allows the agent to view up-to-date information about the customer's persona and deliver the ideal product or service recommendation to meet the customers purchase requirements based on a holistic understanding of their needs. In another case, a customer may be following up with a support agent with an issue around their product or service; here, the updated persona assessment and recommendations generated aid the agent in offering a deal or promotion to alleviate the customer's concerns and resolve the issue.

2. Crisis Hotline: An individual experiencing an urgent mental health issue (such as a panic attack or thoughts of self-harm) reaches out through phone or SMS to a crisis hotline. Here the volunteer (or artificial intelligence) hotline agent converses with the individual to better understand their circumstance and history, while the system and method described herein generates an assessment to diagnose the likely mental health issues at play and recommend the most effective course of action for the volunteer to lead the individual through, to help mitigate risk to the individual.

3. Therapy: A patient involved in recurring mental health sessions with a therapist (in-person or distance through phone, chat, text, or video), wherein the system and method described herein is trained on the specific therapeutic modality in order to create a comprehensive and secure record of the sessions, while using natural language to dynamically diagnose the patient (dimensions and persona) and provide adaptive treatment plan recommendations to the mental health professional following a session. The therapist can also then review trends over time for the patient, to determine progress for the individual and compare their results against others with a similar diagnosis and plan. This method could be utilized as early as after the first intake session, and for both individual and couples therapy.

4. Medicine: A patient suffering from symptoms/ailment enters a healthcare facility (such as a hospital, urgent care, or their primary care physician), or accesses a remote medicine software application for remote health support. The initial intake conversation, as well as any follow-up notes on the case, then become inputs into the system described herein, to provide a likely diagnosis (dimensions and persona), as well as recommended treatment plan. Over subsequent visits/sessions, the diagnosis and recommendations adapt, based on new data gathered through conversations and notes, as the patient moves toward full health.

5. College Counseling: A prospective college student meets periodically with a college counselor (in person or remotely) to figure out the best path to pursue their academic goals after high school. The emergent conversations between student and counselor are ingested by the system and method described herein to classify the student into a persona and suggest the academic paths (schools and programs) that most closely align to their persona, needs, and goals.

6. Academic Advising: A student meets periodically with their academic advisor (in person or remotely) because they are struggling with their first year in school. Their conversations and the advisor's notes serve as inputs into the system and method described herein, which provides the advisor with an assessment of key areas in the student's life related to academic success, as well as their overall persona, and a set of personalized campus resources that may be most helpful for getting the student back on track.

7. Coaching/Mentoring/Counseling: Whether in the domains of life, parenting, career, finance, academics, health, or sports, an individual interacts regularly with a trusted coach/mentor/counselor to set goals and create plans to move toward accomplishing said goals. All the while, their communication interactions are captured and processed by the system and method described herein, to classify the individual into a persona following a session, along with providing both the mentor and the individual with personalized resources appropriate to help them take the next step toward their goals, based on what has historically worked for others with the same persona.

8. Personalized Learning: A learner hopes to complete an online credential to help them secure a promotion at work. While signing up they speak with a digital assistant (or representative from the education provider) to converse about their goals, background, motivation, and barriers. The conversation is then used by the system and method described herein to classify the student into a learner persona and recommend a personalized learning experience that will best fit their needs. As the learner completes units along the way, they have follow-up conversations with the digital assistant which are then used by the system and method described herein to update their persona and adapt their curriculum accordingly, thus creating an emergent and personalized learning experience to increase the odds of a positive outcome for the learner overall.

9. Dating Service: A single individual is seeking a long-term romantic partner but is having bad luck. They turn to a dating service. Within the service they communicate with a matchmaker (human or artificial intelligence, in-person or digitally) and discuss their history, hopes, dreams, and the ideal partner. Natural language recorded from these interactions is used by the system and method described herein to assess important dimensions of compatibility and classify the individual into a persona. Based on the persona, a list of potential partner matches are ranked for compatibility. After a date, the individual and matchmaker check in to discuss how it went and how they are feeling, after which the assessments and persona are dynamically updated, with the list of potential partner matches adaptively updated in turn.

10. Social Media Recommendations/Advertising: Within the context of a social media platform, an individual's language contained within their posts and comments can serve as inputs into the system and method described herein, in order to assess dimensions and classify a persona for the individual. Based on this social persona, which dynamically updates when a new posting occurs, potential new friends, pages, groups, events, organizations, causes, products, and services can be recommended or advertised to the individual, to improve their engagement and enjoyment within the social community.

11. Media Service: A user of an online media streaming service for TV, movies, and video games converses with a digital assistant who asks emergent questions about the user to learn about their history and preferences. From this conversation, the system and method described herein assesses media dimensions and a persona is classified for the user, from which an initial set of media recommendations are made by the system for consumption. As the user begins consuming media content, the system asks open-ended follow-up questions, and reviews the media content consumption and comments posted by the user. These new inputs, in combination with existing interaction records, are dynamically used by the system to update the user's persona and present a refined list of media recommendations adapted to their current classification.

12. Business Directory: An individual is trying to find great restaurants, businesses, live entertainment, and in-person services in their neighborhood (or while exploring a new location). They use an online business directory to look up popular listings. As they check out specific establishments, they go back to the online directory and publish reviews for everywhere they've gone. Based on the natural language in these reviews, the system and method described herein then classifies the individual into a persona and presents them with a recommendation for future establishments to try. The more reviews they write, the more refined their persona and recommendations become, all based on the language in their reviews.

13. Population-Based Consulting and Social Services: Taking the primary use case of a student attempting to return to school and complete a college degree, with the help of a success coaching service, once the personas have been assessed for a meaningful percent of students, the collection of persona analytics information for these individuals can be used to understand broader trends at a given education institution. For example one may find a concentration of personas who are going it alone and have little support outside of school from family and friends. In this example the coaching service provider may provide these population-level insights along with strategic recommendations to the service provider to create additional systematic supports for returning students. Taking this use case a step further, collecting persona analytics information within an entire region such as a city, could yield powerful insights and recommendations about specific social services that are lacking but have a great opportunity to positively impact the community. As strategic recommendations are provided and executed, dynamic assessments and collective trends may continue to be monitored, to determine progress against population-wide goals over time.

14. Self-Service: In any/all of the additional use cases where a representative is illustrated as being the primary user of the persona analytics information in service to an individual, the assessments, classifications, recommendations and other persona analytics information associated with that individual may also be delivered directly to the individual, who would then be empowered to take their own self-directed actions—in other words, an intervention need not be facilitated by a separate representative.

Figure 2:
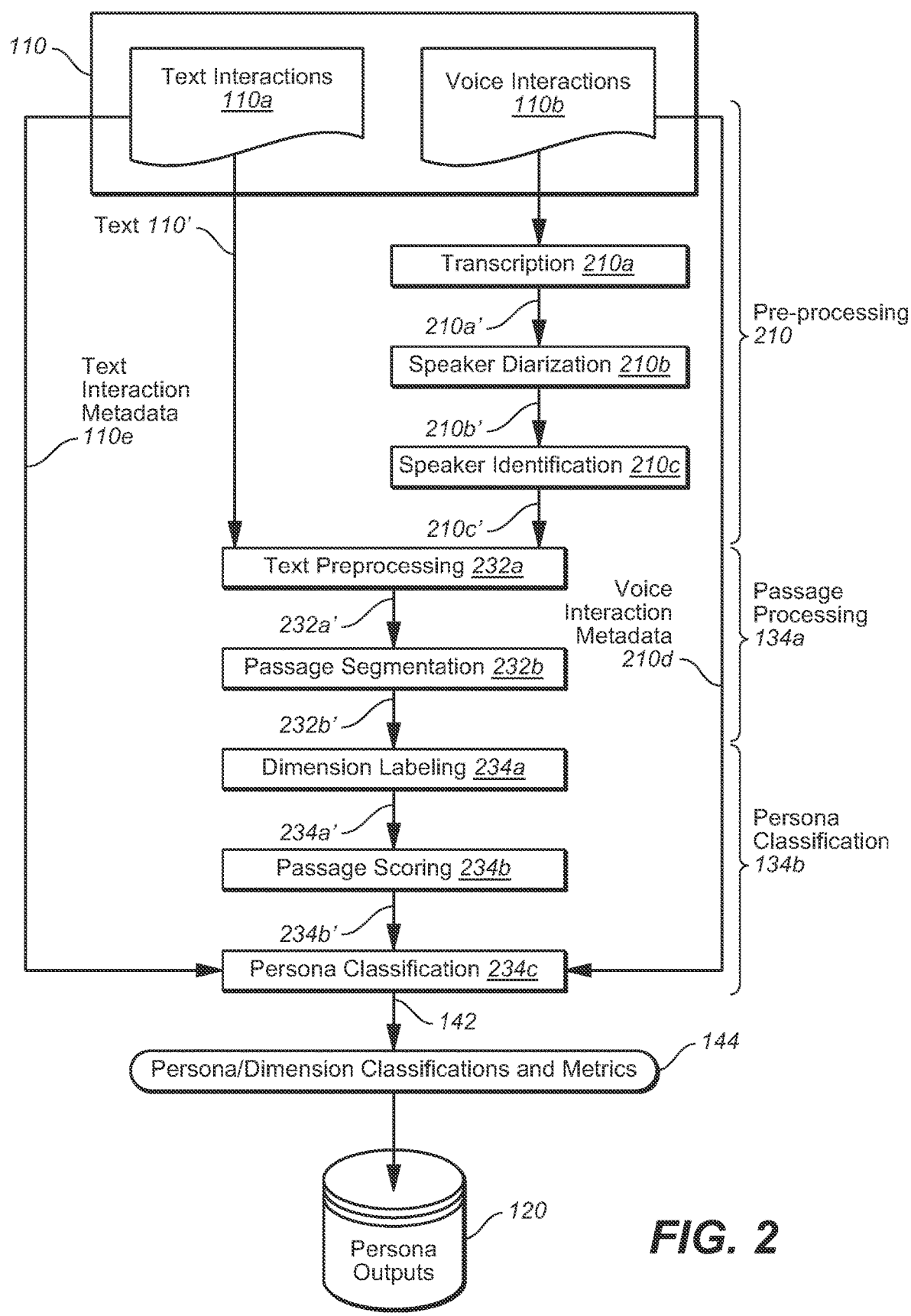
FIG. 2 shows a schematic diagram of aspects of the present subject matter, relating to the system depicted in FIG. 1A.

FIG. 2 shows a schematic diagram of aspects of the present subject matter relating to the system depicted in FIG. 1A. In this aspect, a set of communication interaction records 110 may include, for example, email, SMS, form submissions, chat sessions, phone call recordings/transcripts, audio recording/transcripts, video recordings/transcripts, in-person meeting transcripts, case notes, word documents, letters, sign-language transcriptions.

In one aspect, transcription, diarization, and speaker identification are pre-processing steps ($210a$, $210b$, $210c$, respectively) that are performed by a front-end pre-processing process 210, depending upon type of record. For example, as shown in FIG. 2, one aspect of pre-processing process 210 includes:

Voice interactions (e.g., phone calls) are embodied in voice recordings $110b$;

Transcription process step $210a$ generates transcribed text $210a'$ from voice recordings $110b$ Transcribed text $210a'$ is then input to speaker diarization process step $210b$, to generate diarized text $210b'$ Diarized text $210b'$ is input to speaker identification process step $210c$, to generate diarized-text-with-speaker-labels $210c'$.

Diarized-text-with-speaker labels $210c'$ is then stored, via front-end API of front-end application software $114b$, in database 120 as stored communication interaction records 115.

In another aspect, text interactions such as, for example, email records $110a$, form submissions $110c$, SMS $110d$, and text interaction metadata $110e$ comprise a set of text records $110'$ that undergo minimal or no pre-processing (as shown in FIG. 2); they are stored via the front-end API $114c$ of front-end application software $114b$ as stored communication interaction records 115 in database 120. Other additional optional aspects include processing and storing text interaction metadata $110e$ and voice interaction metadata $210d$ (as shown). Not expressly illustrated in FIG. 2 is communication processing algorithm 132, which, as mentioned above, comprises passage processing algorithm $134a$ (shown) and persona classification algorithm $134b$ (shown).

The result of pre-processing process 210 is a set of stored communication interaction records 115, which enters into a second processing step—communication processing algorithm 132 of back-end application software 131—to generate processed passages. In one aspect and as shown in FIG. 2, passage processing algorithm $134a$ comprises: (a) a text pre-processing process $232a$, which takes, as input, text records $110'$ and/or diarized-text-with-speaker-labels $210c'$, and generates processed text $232a'$; and (b) passage segmentation algorithm $232b$, which takes as input processed text $232a'$ and extracts one or more passages from processed text $232a'$, thereby generating a set of segmented passages $232b'$.

Next, segmented passages 232b' are input into classification algorithm 234 of back-end application software 131. From segmented passages 232b', persona classification algorithm 134b performs a dimension labeling step 234a, which associates segmented passages 232b' with a set of one or more dimensions labels 234a' ("dimension labeling"). Next, segmented passages 232b', which are now associated with dimension label(s) 234a' (as assessed by persona classification algorithm 134b of back-end application software 131) are scored, via passage scoring process 234b, thereby generating scored passages 234b'. Scored passages 234b' are then input into a persona classification step 234c, which generates a classified persona 142 and derives persona analytics information 144, which is then stored in database 120 via a back-end application programming interface.

In this aspect, and as shown in FIG. 2, process text is segmented/extracted prior to dimension labeling ("passage segmentation"); after dimension labeling, passages are associated with one or more dimension labels. In this aspect, a scored passage is determined relative to both the processed passage and the one or more dimension labels for the processed passage ("passage scoring") (e.g. passage="I'm broke" dimension labeling then occurs to determine: "I'm broke"=finance passage scoring then occurs for this passage, to determine "I'm broke"=finance [inhibiting: −0.52]).

Not shown in FIG. 2, but useful in capturing nonverbal communication information to include the set of communication interaction records 110, are video recordings of interactions, or other forms of records relating to, for example, notes on the health of the relationship between a representative and an individual (which may be assessed through other means, such as basic engagement level modeling) and written form submissions.

Further aspects of examples of the processing steps depicted in FIG. 2 are described in the Development Guide of APPENDIX 1, which addresses one aspect of the system and associated method as it may be applied to the educational coaching use case mentioned above (coaching students for educational success).

FIG. 3A is a chart depicting one exemplary aspect wherein the set of persona classifications 138 is based on a set of four dimensions to be assessed (chart columns), and wherein a given possible assessment has either an enabling or inhibiting (positive or negative) potential, which are mutually exclusive assessments (chart rows). In this example, possible assessment categories 136c are "enabling" and "inhibiting" and set of dimensions 136b has four members; data structure 136 is a table of rows and columns.

FIG. 3B illustrates how the exemplary aspect of FIG. 3A defines a data structure 136 represented by a table of sixteen possible persona classifications 138 (138-1, 138-2, 138-3, [ . . . ], 138-16) associated with the set of four dimensions 136b (table columns 136b-1, 136b-2, 136b-3 and 136b-4). In this example, a given persona classification is identified by one of the sixteen assessed dimension permutations for the four identified dimensions (136b-1, 136b-2, 136b-3 and 136b-4), where there are two mutually exclusive possible assessment categories 136c (here as shown, enabling (136c-1) and inhibiting (136c-2)) per dimension. In this example, data structure 136 is a table of sixteen rows, wherein a first persona classification 138-1 is associated with all four dimensions assessed as "enabling;" a second persona classification 138-2 is associated with the first three dimensions assessed as "enabling," and the fourth assessed as "inhibiting;" etc.

FIGS. 3A and 3B are exemplary; depending upon the application, any number of dimensions, each having any number of potential assessments may be used. The total number or persona classifications 138 possible would then be based upon the total number of possible permutations for assessment categories 136c.

FIGS. 4A, 4B, 4C and 4D illustrate several different examples of how a plurality of recommendations 137 (e.g. interventions) may be matched to possible dimensions 136b in varying levels of possible complexity (e.g., basic modular, intermediate modular, and advanced modular, and whole persona), for some aspects of the present subject matter. In some aspects, matching occurs in back-end data processing system 130, where at least one dimension 136b-1 is matched to at least one intervention recommendation (137-i) identified from plurality of recommendations 137 and based upon classified persona 142.

Figure 4A:
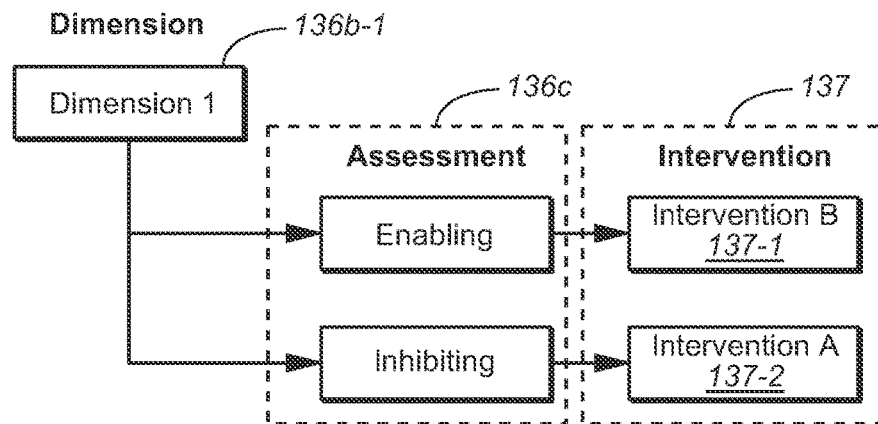
FIGS. 4A, 4B, 4C and 4D illustrate several different examples of matching intervention recommendations, in varying levels of possible complexity (e.g., basic modular, intermediate modular, and advanced modular, and whole persona), to assessed dimensions for some aspects of the present subject matter.
Figure 4B:
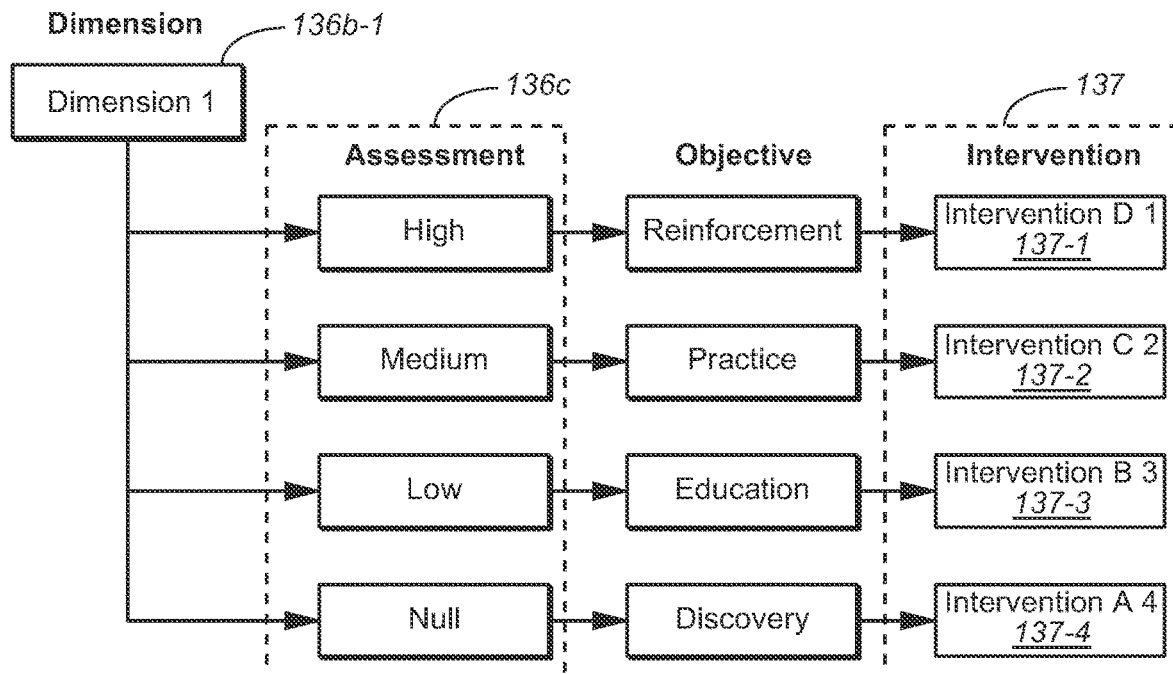

Referring to FIG. 4A, in one aspect ("Basic Modular"), plurality of recommendations 137 may consist of two possible interventions—Intervention A (137-1) and Intervention B (137-2)—arising from one dimension 136b-1 having two, mutually exclusive assessment categories: enabling (136c-1) or inhibiting (136c-2). FIG. 4A illustrates a single example of a Basic Modular implementation; in this aspect, any number of assessment categories may be used for any number of dimensions Referring to FIG. 4B, in another aspect, ("Intermediate Modular"), plurality of recommendations 137 may consist of four possible interventions—Interventions A (137-1), B (137-2), C (137-3) or D (137-4)—arising from one dimension 136b-1 having a set of four (mutually exclusive) assessment categories 136c, shown here as comprising: high (136c-1), medium (136c-2), low (136c-3), or null (136c-4). Further to this aspect, assessment categories 136c may include an associated objective (as described below), leading to a plurality of recommendations 137 (e.g. Interventions 137-1, 137-2, 137-3, 137-4). FIG. 4B illustrates a single example of an Intermediate Modular implementation; in this aspect, any number of assessment categories (and associated objectives) may be used for any number of dimensions.

Figure 4C:
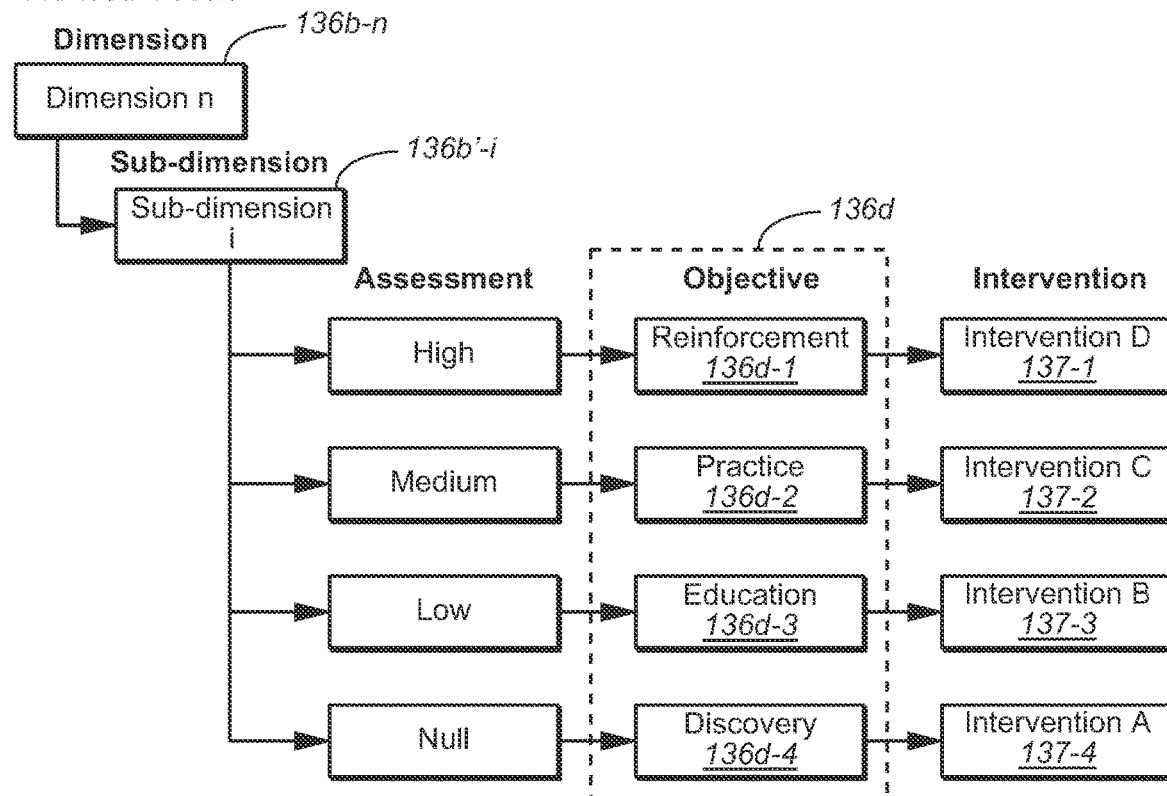

Referring to FIG. 4C, in yet another aspect ("Advanced Modular"), plurality of recommendations may include a set of sub-dimensions 136b', for each dimension n, wherein a given sub-dimension (136b'-i) may have a plurality of mutually exclusive assessments (e.g. high, medium, low or null, as shown in the example of FIG. 4C), and those in turn having an associated objective (e.g., reinforcement 136d-1, practice 136d-2, education 136d-3, discovery 136d-4) from a set of objectives 136d, leading to a plurality of recommendations 137 (e.g. Interventions 137-1, 137-2, 137-3, 137-4).). FIG. 4C illustrates a single example of an Advanced Modular implementation; in this aspect, any number of assessment categories and associated objectives may be used for any number of dimensions and/or subdimensions.

FIGS. 4A, 4B and 4C are merely exemplary; the total numbers of dimensions, subdimensions, assessment categories, objectives and interventions are not limited to the examples shown.

As shown in FIGS. 4B and 4C, in some aspects, "Assessment" labels Null, Low, Medium, and High are optional categorical labels depending on the score of a given dimension. If no score is present, then Null; if a score is present, then it can be split up into any number of percentiles or thresholds. Also as shown in the examples of FIGS. 4B and 4C, "Objective" refers to a goal of either a representative or an individual (in a self-service scenario), based on the Assessment of a dimension or sub-dimension, and an "Intervention" is delivered to achieve the "Objective."

In one aspect, for example, and referring to FIG. 4B, assessment of a "Self" dimension leads to one of the following possible interventions:

If "Self"=Null: discover info by asking questions so that the dimension can be assessed (Intervention A);

If "Self"=Low: use a 'growth mindset' intervention to educate the individual on a new concept (Intervention B);

If "Self"=Medium: practice a new concept of 'growth mindset' repeatedly to create progress (Intervention C);

If "Self"=High: once the individual's mindset has shifted, reinforce the change for permanent effect (Intervention D).

Figure 4D:
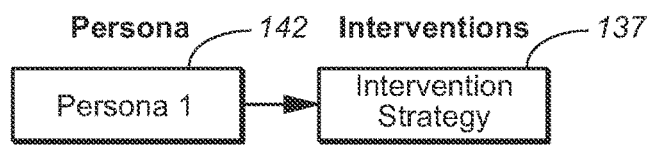

Referring to FIG. 4D, in lieu of the modular approaches described in FIGS. 4A, 4B and 4C above, a whole persona approach may be taken, in which the plurality of recommendations 137 comprises an intervention strategy, which is defined or identified to be associated with a given classified persona 142.

2. Front-End Application GUI (Examples)

FIGS. 5A, 5B, 5C, 5D, 5E, 5F, 5G, 5H, and 5I illustrate several different examples of optional front-end application GUI 114a presentation formats for visualizing persona analytics information 144 on output hardware device 114, as displayed to a representative for some aspects of the present subject matter.

Figure 5A:
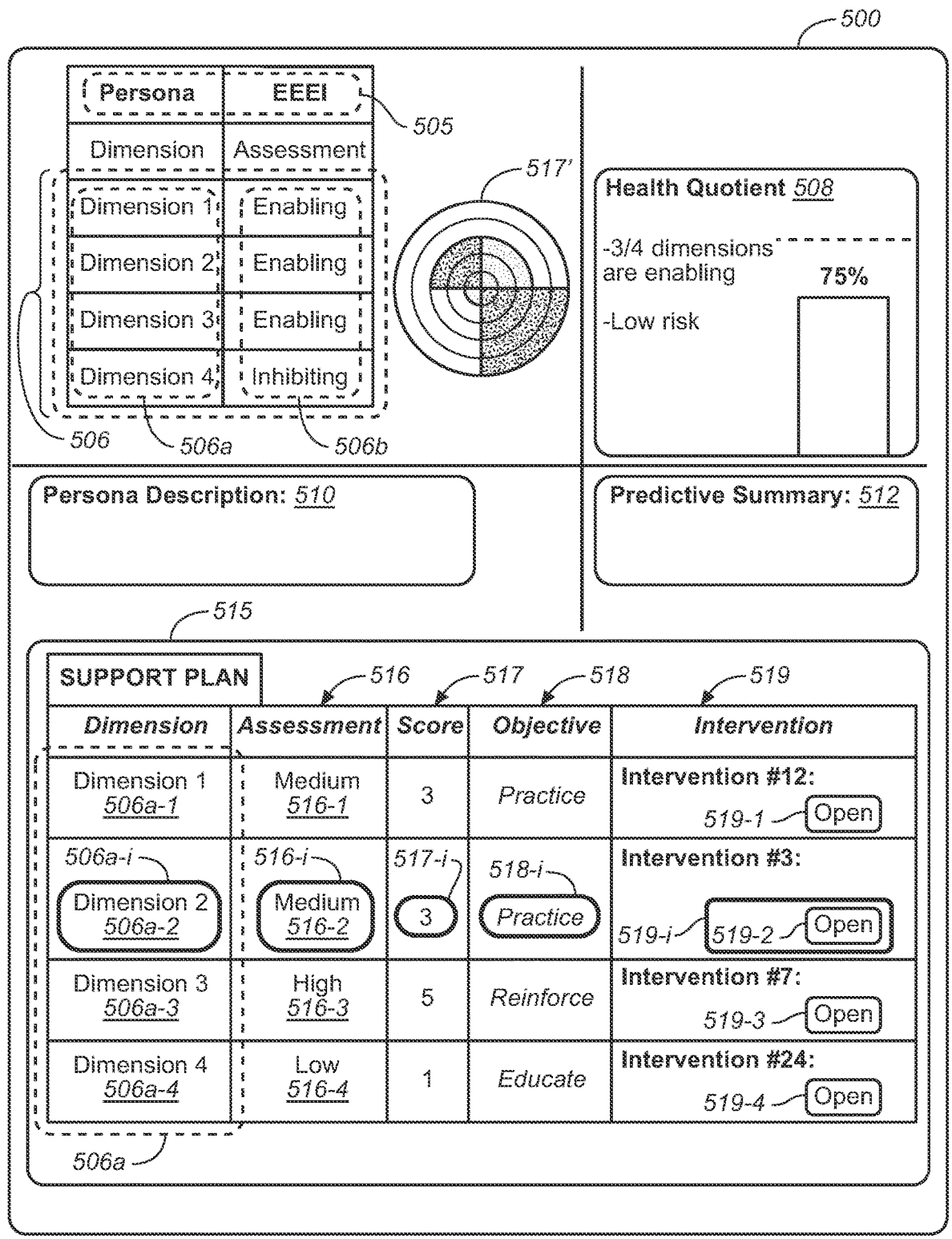

FIG. 5A illustrates a basic representative view format (stand-alone) GUI 500. In this use case presentation format, GUI 500 allows representatives to review the latest assessments for each individual they serve. In this aspect, front-end application GUI 114a displays the overall classified persona 505 for an individual, a set of assessed dimensions 506 (including a set of dimensions 506a and corresponding assessments 506b) for the individual, a health quotient 508 (e.g., a percentage of enabling dimensions) relating to the assessed dimensions, a persona description 510 and a predictive summary 512, along with a corresponding Support Plan 515. In some embodiments, Support Plan 515 displays: an assessment label 516-i; a set of dimension scores 517, comprising a dimension score 517-i of each dimension (i) in the set of dimensions 506a; additional background information 518 about classified persona 505 (e.g., a set of objectives, as shown); as well as a set of specific personalized recommendations 519 (e.g. interventions), which the representative can then take action on, via "Support Plan" presentation 515. In some embodiments, suggested actions may be accessed through a link 519-i. In some embodiments, dimension scores 517 may be visualized in a graph 517' (e.g. a radar chart, as shown).

Figure 5B:
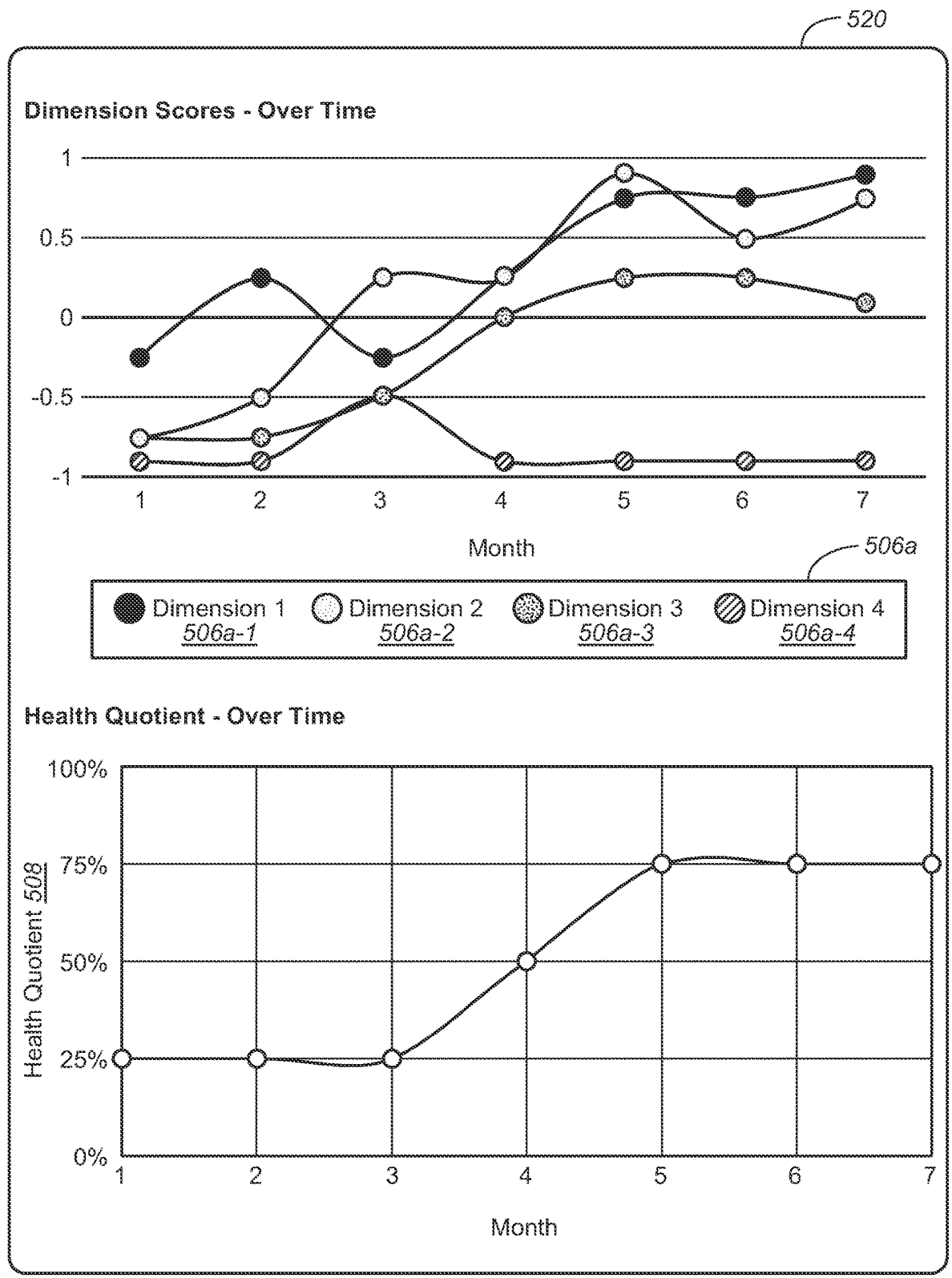

FIG. 5B illustrates a basic representative view format over time GUI 520. In this use case presentation format, GUI 520 allows representatives to understand how dimension assessments (quantified as a set of dimension scores 517) and overall health (quantified as a health quotient 508) of an individual they serve have changed over time. Such trends may illustrate if the individual is moving toward or away from accomplishing (or avoiding) a defined outcome.

FIG. 5C illustrates a CRM (customer relationship management software)-embedded representative view GUI 530. In this use case presentation format, GUI 530 shows how persona analytics information 144 generated at the back-end application software 131 of the system described herein can be embedded into existing customer relationship management software and visualized for representatives to take action against, using Salesforce as the example.

For example, in the use case shown in FIG. 5C, dimensions identified as relevant to coaching of educational re-entry students focus on supporting the development of four primary relationships in a student's life—relationships that can enable or inhibit success in returning to school (the outcome) and completing a degree. These relationships are referred to as "spheres" (or dimensions 506), each of which can be evaluated on an ongoing basis to inform service delivery. They include Self (a student's relationship with themselves), University (a student's relationship with their school), External (a student's relationships outside of school—including family, friends, and work), and Coach (a student's relationship with their re-entry coach). Thus, referring to the example use case of FIG. 5C, the first column of the "Support Plan" 515 notes dimensions 506a (Self, University, External, Coach), the second column 516 notes an assessment label ("Uncertain," "Promoting," "Supported", "Reluctant"), the third column 517 notes a numerical score per dimension, and the fourth column 519 summarizes actual, adaptive intervention recommendations (a set of personalized recommendations) to be used by a representative (coach) using the system described herein, based on each dimension's current assessment. In some embodiments, dimension scores 517 may be visualized in a graph 517' (e.g. a bar chart, as shown).

Figure 5D:
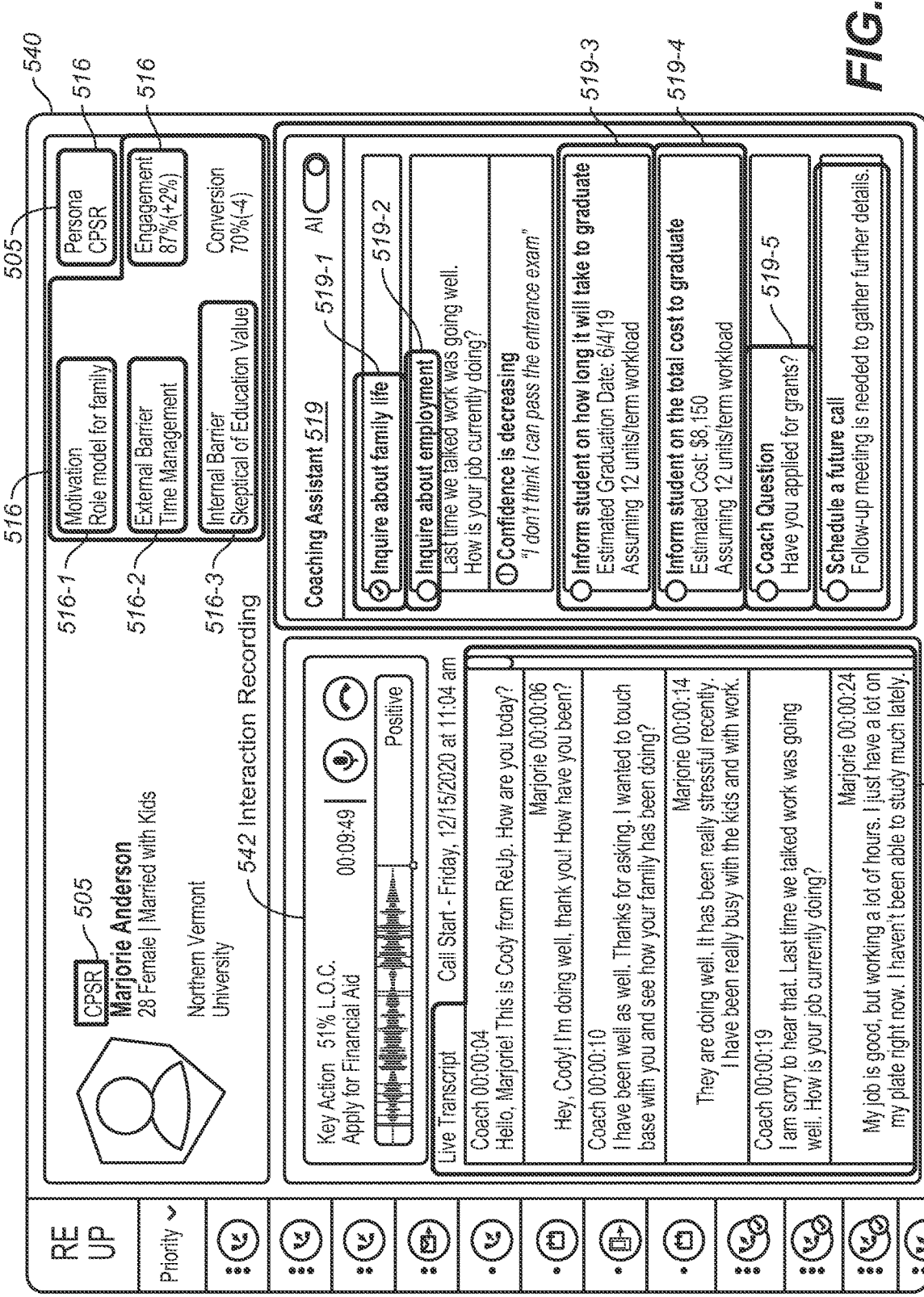

FIG. 5D illustrates a real-time representative view GUI 540. In this use case presentation format, GUI 540 displays voice recordings 542 of interactions between individual and representative are being transcribed, visualized, and assessed dynamically in real-time. The specific personalized recommendations 519 adapt to assessments 516 as they are being made, so that the representative can act on them without delay. In the example shown, a "COACHING ASSISTANT" bar 519 displays specific personalized recommendations (e.g., 519-1 ("Inquire about family"); 519-2 ("Inquire about employment"); 519-3 ("Inform student on how long it will take to graduate"); 519-4 ("Inform student on the total cost to graduate") as the conversation is assessed in real-time within a "LIVE TRANSCRIPT" window 544.

Figure 5E:
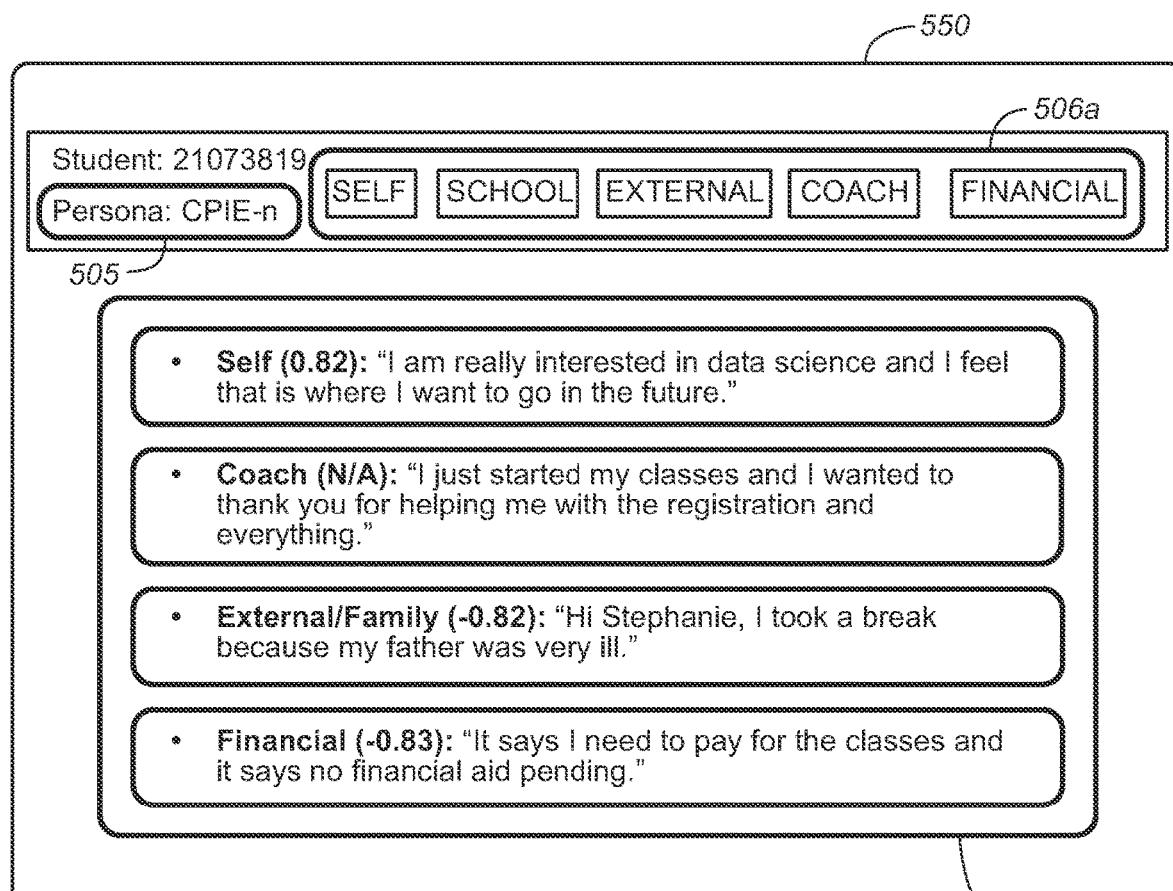

FIG. 5E illustrates a basic representative view with passages GUI 550. In this use case presentation format GUI 550, a representative can see each individual's persona 505, the current assessment of each dimension in the set of dimensions 506a (Self, School, External/Family, Coach, and Financial) along with a set of passages 552 within one or more dimensions 506a from which the assessments 516 (see FIG. 5D) were made. This next level of detail provides full context for assessments 516, making them interpretable and actionable. In one aspect, color coding on dimensions 506a (and/or scored passages 234b') may be used to indicate assessment levels for each dimension (and/or scored passage), for example, on a color spectrum from blue (fully enabling) to red (fully inhibiting).

Figure 5F:
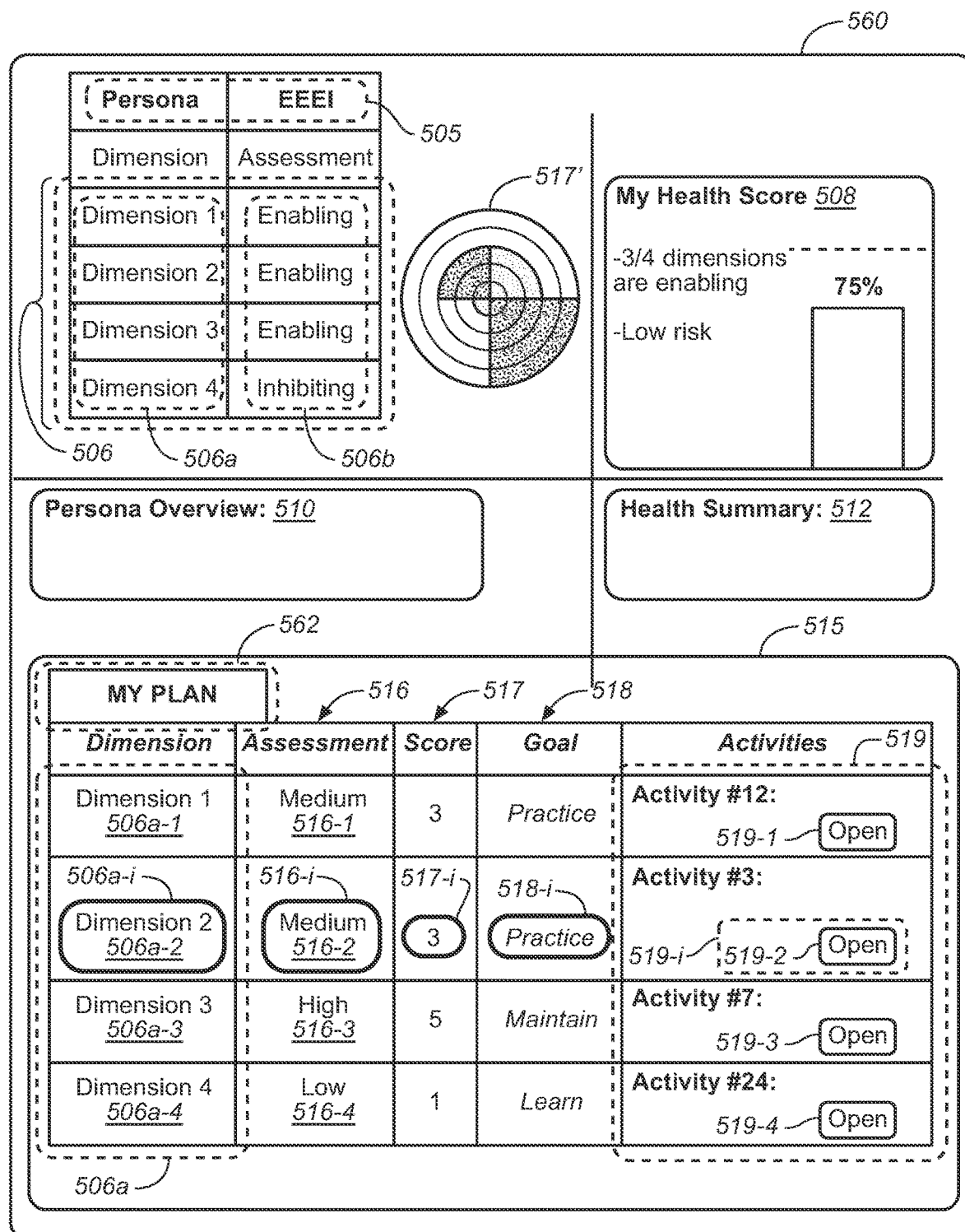

FIG. 5F illustrates a basic individual view GUI 560. In this use case presentation format, GUI 560 is similar to GUI 500, except that in this view, an individual is provided with a front-end application GUI from which they can understand their current persona 505 and set of assessed dimensions 506a, their overall health 508, as well as being offered specific personalized recommendations 519 as "intervention activities" that they can execute to self-serve and improve their likelihood of achieving a desired outcome (or avoiding a negative outcome) (via "My Plan" presentation 562).

Figure 5G:
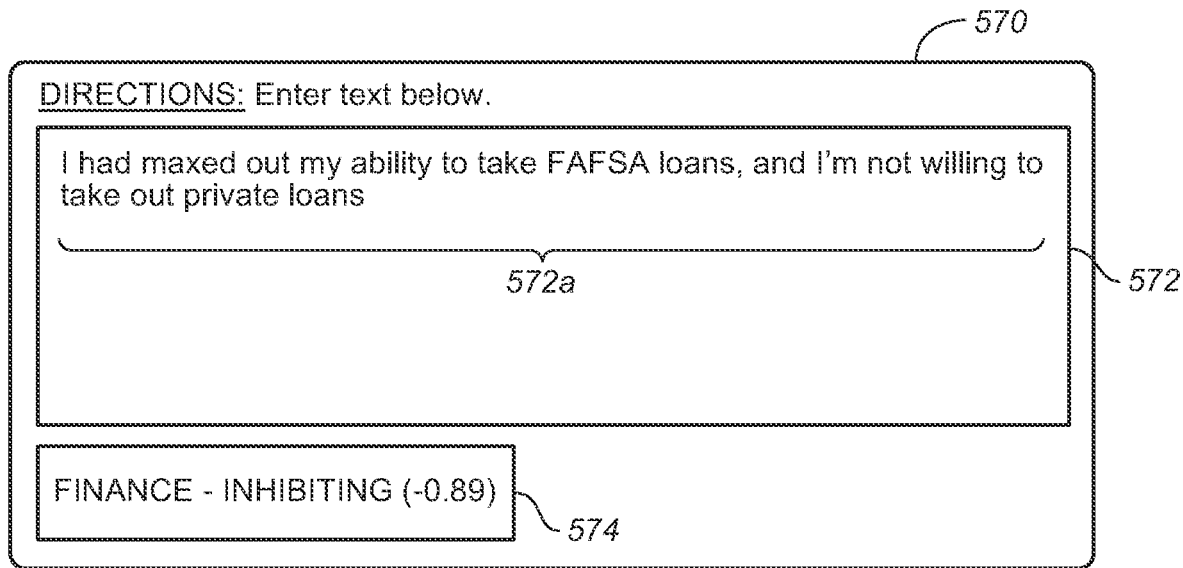

FIG. 5G illustrates an ad hoc passage analysis view GUI 570. In this use case presentation format, GUI 570 facilitates an individual, representative, or other user to enter text into a front-end text entry interface 572 to assess the contents of entered text 572*a* on an ad-hoc basis. As shown in this example, this feature allows for immediate passage labeling, passage scoring, and dimension assessment 574 of entered text 572*a* (among other benefits).

Figure 5H:
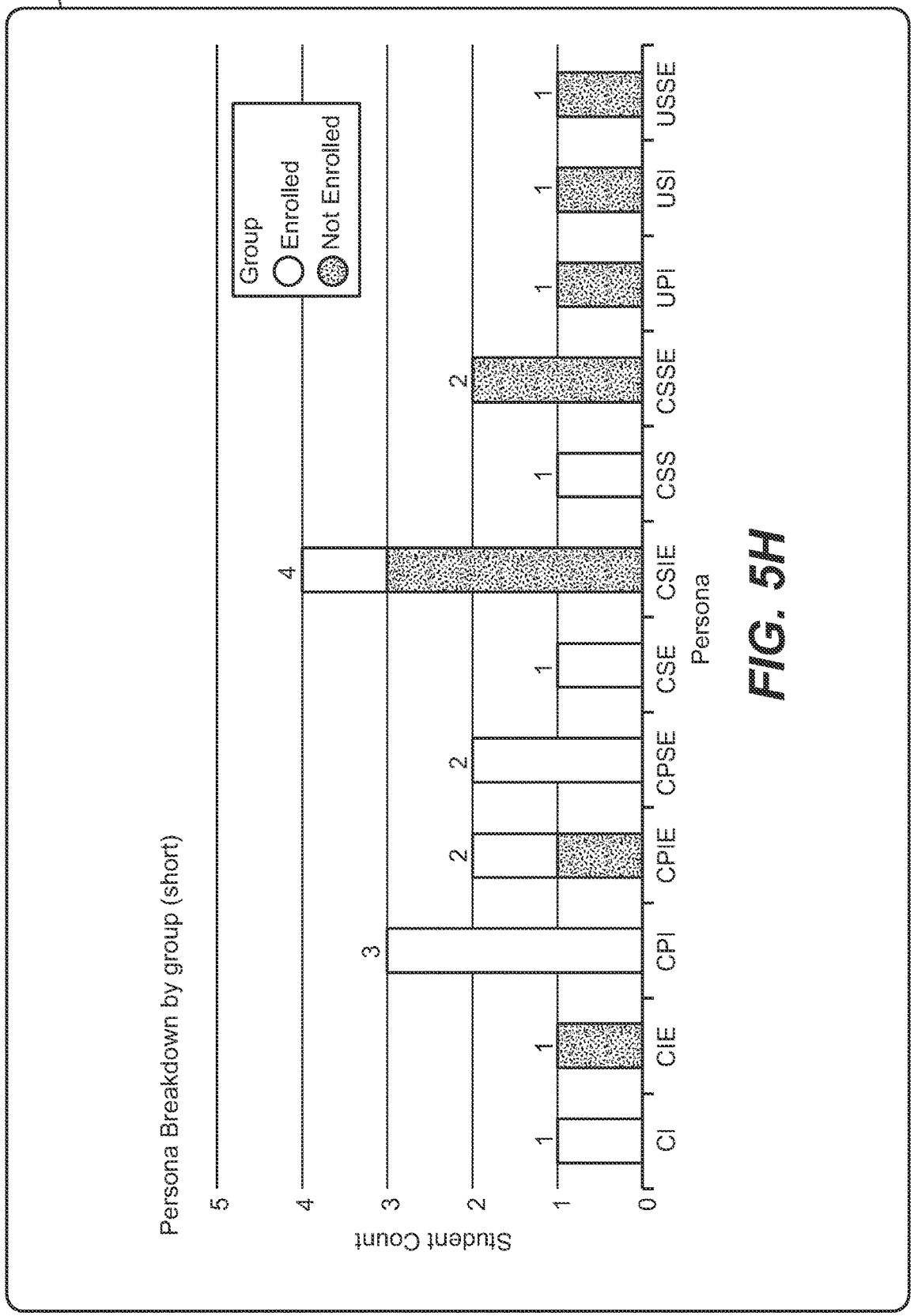

FIGS. 5H-5I illustrate various examples of population analyses using the system and method described herein. In these aspects, the representative (or individual) may use the data and information displayed by the front-end application GUI 114*a* (FIG. 1A) as an aid in providing (or obtaining) adaptive, personalized interventions, recommendations, and/or other advisory services to (or by) an individual being served. The use case presentation formats shown in these figures move beyond individuals and representatives, to aggregate persona analytics information across groups of individuals to generate insights. These front-end examples, as shown in FIGS. 5H-5I, illustrate various types of population analyses, allowing users to understand the answers to questions such as, "what personas are most common within this population?" and "which personas have the greatest likelihood of arriving at a specific outcome?

As mentioned above, graphical user interfaces of the system can be used by representatives to aid in the provision of adaptable, personalized service to groups of individuals. For example, in an educational setting, selecting dimensions based on identified relationships (for example, Self, School, Family, Work, Finances, and Coach) in students' lives can impact success in returning to (and completing) a degree curriculum. Thus, by way of illustration, persona analytics information obtained by the system and method described herein may be used in education re-entry coaching as follows:

FIG. 5H illustrates a use case presentation format GUI 580 showing persona breakdown by group. In the use case shown—educational re-entry coaching—the groups illustrated are "enrolled" vs. "not enrolled" in a student population under consideration. Hence, as shown in FIG. 5H, "Group" refers to whether or not a student has achieved the target outcome (re-enrolling), Persona acronyms refer to assessments (C=Confident; P=promoting; S=skeptical; U=uncertain) for a plurality of up to four dimensions (as shown, some students have less than four dimensions assessed, hence, less than four letters in the acronym). Referring to FIG. 5H, stacked bars reveal how many students within each persona have achieved the identified outcome "enrolled."

FIG. 5I illustrates a use case presentation format GUI 590 for the same exemplary use case (re-entry coaching), showing percentages in a student population comprising ten different personas, and for each of those ten personas, the system generates and displays (e.g., in a chart, as sown) the percentage of those students who are actively enrolled. As shown in FIG. 5I, dimensions 506*a*, comprising "Self," "Coach," "External," and "School," are listed in columns of the chart and refer to coaching "spheres" (dimensions), while each row of the chart represents a specific persona classification 141 in a plurality of persona classifications 507 ("N" stands for null, "I" for inhibiting, "E" for enabling, as assessed per dimension); the "Student %" column 592 refers to the percentage of students in the student population with a given classified persona (as determined by the system and method described herein) within the student population. The "Enrollment %" column 594 refers to the percentage of students who achieved the identified outcome of re-enrolling.

The presentation formats shown in FIGS. 5A, 5B, 5C, 5D, 5E, 5F, 5G, 5H, and 5I are exemplary only as representative for some aspects of the present subject matter. Other presentation formats for population analysis purposes may include: one-dimensional line charts (e.g. for visualizing trends over time), two-dimensional population line charts (e.g. for visualizing relationships between dimensions, health quotients, and classified personas, and achievements of outcomes); scatterplots; grouped bar charts; stacked bar charts; pie charts; radar charts; polar charts; cluster plots; area graphs; bubble charts; chord diagrams; histograms; radial bar charts; span charts; stacked area charts; sunburst diagrams; table charts; pivot tables; venn diagrams; box and whisker plots; population pyramids; cluster analyses; density plots; stream graphs; candlestick charts; heat maps; arc diagrams; non-ribbon chord diagrams; donut charts; progress bars; dot matrix charts; marimekko charts; proportional area charts; sankey diagrams; sunburst diagrams; wordclouds; bullet graphs; choropleth maps; timetables; spiral plots; and combination charts.

3. Processing Steps

In a further aspect, a set of one or more interventions or possible recommendations related to each assessed dimension (or to at least two respective interventions related to each classified persona) is identified. In this aspect, once the outcome(s) and dimension(s) are identified and deemed feasible to reliably capture described interactions (and natural language data) for a given use case, as well as to select (or otherwise match) interventions, the method steps outlined in Table II (below) may be performed, in order to deliver dynamic persona classification with adaptive, personalized intervention/recommendations.

TABLE II

| INPUTS | PROCESS | OUTPUTS |
| --- | --- | --- |
| 0a. Outcome hypotheses | Research and analysis | Final selected outcome(s) |
| 0b. Dimension hypotheses | Research and analysis | Final selected dimension(s) |
| 0c. Intervention hypotheses | Research and analysis | Final selected interventions |
| 1. Emails/SMS/Chat/Forms | Text preprocessing | Processed text |
| 2. Processed text | Passage segmentation | Segmented passages |
| 3. Voice recordings | Transcription | Transcribed text |
| 4. Transcribed text | Diarization | Diarized text |
| 5. Diarized text | Speaker identification | Speaker labeled text |
| 6. Speaker labeled text | Passage segmentation | Segmented passages |
| 7. Segmented passages | Dimension labeling | Dimension-labeled passages |
| 8. Dimension-labeled passages | Passage scoring | Scored passages |
| 9. Scored passages | Averaging scores per dimension and per individual | Aggregate dimensions scores and dimension labels per individual |
| 10. Classified dimensions and scores | Persona classification | Classified persona per individual |

TABLE II-continued

| INPUTS | PROCESS | OUTPUTS |
| --- | --- | --- |
| 11. Classified dimensions and scores | Intervention/recommendation matching | Interventions/recommendations per individual |
| *12. Classified dimensions and scores | Counting enabling dimensions out of total dimensions | Overall health toward an outcome per individual |
| *13. Individual persona analytics information | Aggregate within a population | Persona population analysis |
| *14. Outputs from #8-13 | API | Visualization within front-end application, ready for use |

Thus, one aspect of the dynamic assessment and classification method for delivering personalized recommendations using natural language processing and machine learning, as described herein, employs inputs, processing and outputs for exemplary processing steps as generalized above in Table II. Variations may also be included, as described in further detail below.

For example, in some aspects, the system repeats the assessment and classification processes nightly (or at any chosen interval) for individuals for whom there is new data to process. Updated persona analytics information is thereby obtained and then stored in the database, and also sent to a front-end application, so that representatives can use the most current and comprehensive ("dynamic") assessments, classified personas, intervention recommendations, and labeled passages to aid in the provision of services when interacting with the individuals they serve.

Further, when deployed on a multi-individual scale, the system and methods described herein can also yield valuable insights about entire populations or segments, in addition to the value they provide at the individual level.

Optional Features

Referring to Table II, note that if phone calls are not a channel of communication, then the input-processing-output steps 3-6 (for which inputs are described as "3. Voice recordings;" "4. Transcribed text;" "5. Diarized text;" and "6. Speaker labeled text") are not performed—i.e., extracted text documents are processed (passage segmentation), thereby generating segmented passages that are sent to a dimension labeling process for generating dimension-labeled passages (see Table II, "7. Segmented passages [Inputs]—Dimension labeling [Process]—Dimension-labeled passages [Outputs]").

Aside from optional use of phone calls as a communication channel 109 for obtaining a set of communication interaction records 110, other processing steps that may be optionally implemented in or performed by the dynamic assessment and classification system of the present subject matter include those shown in Table II, Rows 11, 12, 13, and/or 14, since: (a) intervention recommendations may not be used in some aspects of the method (Table II, Row 11), and/or (b) system features such as evaluating overall health towards an outcome/goal per individual (Table II, Row 12), persona analytics on a population (Table II, Row 13), and/or visualization of persona analytics and trends using a front-end application graphics/visualization methods (Table II, Row 14) may not be implemented for some aspects of the system and method described herein.

Other optional aspects include the following optional system architectural components and/or optional algorithmic steps or scenarios:

Referring to Rows 0a, 0b, and 0c of Table II, a data processing system and computerized technology may optionally be used repeatedly, and across contexts, to:
  select a target outcome (Table II, Row 0a);
  discover and formalize a set of dimensions that are predictive of the target outcome (Table II, 0b)—this process may include (1) establishing natural language markers on communication interaction records, and (2) testing hypotheses regarding possible dimensions that are predictive of one or more outcomes and, in particular, the target outcome;
  author a set of personal recommendations according to the set of dimension(s), by establishing a set of assessment categories (which can be used to establish a plurality of persona classifications) and indexing the dimension(s) according to the a set of personal recommendations into an index that inform the delivery of a personalized recommendation (Table II, Row 0c);
  save, host, and run a custom application of the methods of dynamic assessment and classification for delivering adaptive personalized recommendations described herein; and
  integrate the output of the custom application into desired endpoint(s) for customized use.

Thus, optional aspects include—
a) Computerized data processing steps to identify or define one or more outcomes, dimensions that correlate to the outcome(s), and personal recommendations (such as, for example, evidence-based intervention recommendations);
b) Computerized data processing steps to use historical data to identify one or more outcomes, and/or dimensions that correlate to outcome(s), or, if historical data does not exist, to train classifiers on labeled data through supervised learning, then using unsupervised learning optionally;

and additional optional aspects include—
c) Naming discrete personas through acronyms, titles, and long-form descriptions (as part of the ancillary metrics of persona analytics information 144);
d) With adequate pre-processing, additional types of communication channels 109 may be used to provide a set of communication interaction records 110, including but not limited to: video messages; voice memos; social media posts; blog posts; in-person meeting transcripts; case notes; word documents; chat exchanges; sign language transcriptions; etc.
e) A representative interacting with an individual may or may not be another human, i.e., it may be an artificial intelligence;
f) Natural language communication interaction records can be captured in many ways, for example, through an interactive chatbot, a digital assistant, a digital agent, a survey of some kind, or any combination thereof (including human and non-human interactions);

g) Within the context of a human-to-human interaction or a human-to-digital one, the communication interaction may be natural and emergent in nature, or executed following a fixed protocol or sequence;

h) Dimensions that are difficult to assess via natural language processing (such as, for example, the health of the relationship between a representative and an individual) may be assessed through other nonverbal means, such as basic engagement level modeling (such as measuring the volume, frequency, or ratio of interactions between individual and representative in order to understand level of engagement and therefore gain the ability to assess that dimension); such information may be coded and stored as part of the ancillary metrics of persona analytics information 144;

i) The system and method described herein may be used dynamically over time, or alternatively, for one-time and point-in-time use cases through, for example, various ways to capture/record an interaction (e.g., natural dialogue between individual and representative, a strict interview protocol, survey assessment(s), digital assistant conversations, or otherwise). When used over time, this creates the option of visualizing an individual's persona analytics information from any given moment or window in time, which also allows one to evaluate a complete history of changes over time in assessments, classifications, and recommendations;

j) The timing of the data processing within the application can also be configured to any interval, for example: as rapidly as real-time as each interaction occurs for each individual; twice a day; every hour; once a day; once a week; etc.;

k) A dimension can also have nested sub-dimensions or variables within it;

l) The system and method described herein can be used to build predictive models leveraging an individual's persona analytics information, in order to calculate an individual's likelihood of achieving (or avoiding) an outcome; such predictions based upon assessments may be stored as part of the ancillary metrics of persona analytics information 144.

m) Partial personas may occur when data does not yet exist across some dimensions for an individual; partial personas may be used as-is, or the system may be configured to wait until a full assessment is possible across pertinent dimensions before being used;

n) Continued iteration to tune classification models based on any weak areas, as well as periodic evaluation of success of an intervention's impact on outcomes, are useful steps to include, but are not required;

o) Assessments based on scored passages can be configured through an all-time average, a moving average, an exponential moving average (which has the advantage of improving accuracy and creating dynamic assessments over time), or for discrete time windows of scored passages, or any number of computational methods;

p) A Front-end application for graphical outputs/presentation formats is also optional: Persona analytics information may be accessible to a representative in forms other than the visualization examples as provided herein;

q) Front-end application outputs may optionally include user experiences for representatives as well as for individuals, both at the individual level, or viewed as populations or segments of a population; any or all persona analytics information may be visualized or omitted within a front-end user experience, including actual passages that have been labeled in order to determine assessments;

r) Text pre-processing steps, including full diarized and speaker identified transcripts, may be provided by the Front-end Application for utilization by a representative, which may be of discrete value to the representative, as it provides context around the assessed and scored passages;

s) While recommended interventions may be delivered to the individual through the representative, any number of interventions may be sent directly to the individual, depending on the type. For example, watching a video, receiving a specific message, reading an article, or completing a writing exercise, can be utilized as an intervention recommendation, with or without a representative's involvement, as can content, message or experience that can be safely delivered to the individual without human oversight/supervision;

t) The complexity of the recommendation system is also flexible. As shown in FIG. 4A, for example, a basic system may use just two interventions based on a binary classification of a single dimension. Tiers may optionally be added as illustrated in the 'intermediate' diagram of FIG. 4B, where null, low, medium, and high thresholds are set, corresponding to objectives and interventions. Other structures may be used. Additionally, if nested sub-dimensions are utilized, intervention levels can be employed at either the dimension level, the sub-dimension level, or both (as illustrated in the Advanced Modular diagram of FIG. 4C). Also, in lieu of the modular approaches illustrated in FIGS. 4A, 4B, 4C, a 'whole persona' based approach may be utilized, as illustrated in FIG. 4D. These levels of complexity are examples of various options; and u) Using data security for the system is optional, given the sensitivity of individual data being used for assessment, for example, all data may be encrypted in transmission and at rest.

Figure 6:
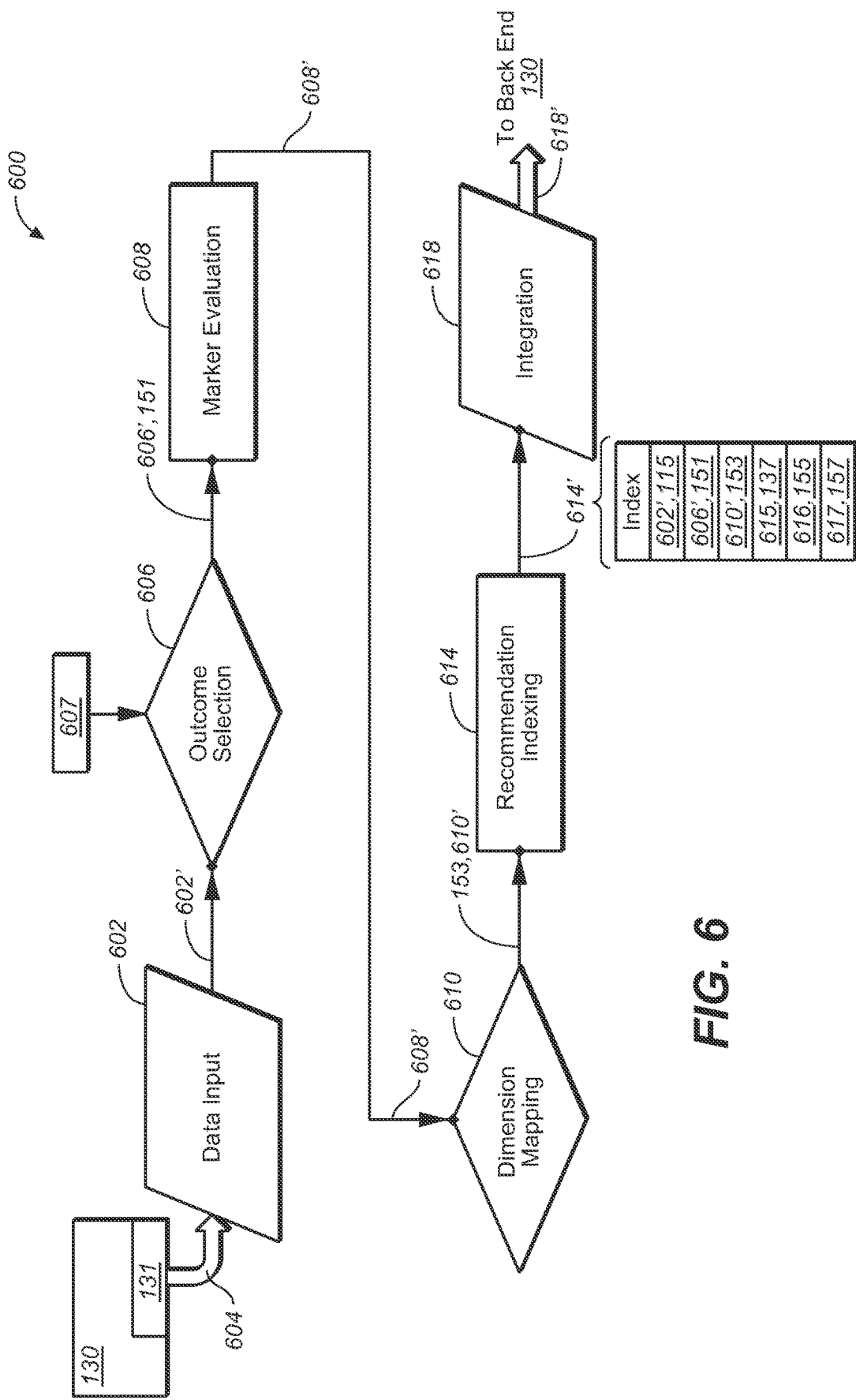
FIG. 6 shows one embodiment of a method described herein.

FIG. 6 shows one embodiment of a method described herein relating to: (a) computerized data processing steps to identify or define one or more outcomes, dimensions that correlate to the outcome(s), and personal recommendations (see above); and (b) computerized data processing steps to use historical data to identify one or more outcomes, and/or dimensions that correlate to outcome(s), or, if historical data does not exist, to train classifiers on labeled data through supervised learning.

As shown in FIG. 6, in one aspect, a developer platform comprises a data processing system 600 comprising a computer-readable storage medium having a non-transitory computer readable program stored therein, wherein the non-transitory computer readable program, when executed on a computing device of the data processing system 600, causes the computing device to perform the following processes:

A Data Input Process 602: Stored communication interaction records 115 (as defined prior) and/or other historical data records 603 (not shown) are processed via Data Input Process 602 to generate a set of input data records 602' for additional processing by data processing system 600. Input data records 602' may be entered ad hoc, or via at least one data bridge providing a communication link 604 to one or more data sources, such as back-end data processing system 130 of data processing system 100 (FIG. 1A). Thus, in some aspects, data input process 602 interfaces to back-end data processing system 130 via communication link 604 and back-end application software 131 (FIG. 1A).

An Outcome Selection Process 606: Input data records 602' and a set of outcome records 607 are then input into Outcome Selection Process 606, which determines a set of target outcomes 606' to be used by data processing system 600 in identifying sets of dimensions and assessment categories relevant to target outcome(s) 606'.

A Marker Evaluation Process 608: Once the set of target outcomes 606' has been determined, Marker Evaluation Process 608 references input data records 602' with respect to target outcome(s) 606', in order to provide a set of suggested communication markers 608' (aka sub-dimensions) that are most predictive of the set of target outcomes 606'. Additionally, if hypotheses exist around other formulations of communications markers potentially predictive of target outcome 606'—either prior to review of suggested communication markers 608' or subsequently—those hypotheses can be reiteratively tested and evaluated. Thus, marker suggestions 609 and hypothesis testing may form a cycle of discovery and refinement until suggested communication marker(s) 608' are identified.

A Dimension Mapping Process 610: Once suggested communication marker(s) 608' (aka sub-dimensions) have been identified, Dimension Mapping Process 610 identifies a set of mapped dimensions 610' by mapping suggested communication marker(s) 608' into one or more groups of related markers 612 (not shown).

A Recommendation Indexing Process 614: Once the set of mapped dimensions 610' has been mapped into one or more groups of related markers 612, Recommendation Indexing Process 614 compiles a recommendation index 614' by identifying (i) a set of indexed recommendations 615 and (ii) a set of indexed dimension assessment categories 616, from which a set of indexed persona classifications 617 are derived (as permutations of assessment categories for each dimension). In this aspect, recommendation index 614' is customized to input data set 602' and comprises the various identified sets of: (a) mapped dimensions 610'; (b) indexed recommendations 615; (c) indexed dimension assessment categories 616; and (d) indexed persona classifications 617. Recommendation index 614' is input to an integration process (described below).

An Integration Process 618: Once recommendation index 614' is compiled, representing a customized application of one aspect of the system and method described herein, Integration Process 618 communicates recommendation index 614' to back-end data processing system 130, over data bridge communication link 604, which in turn executes back-end application software 131, so as to generate dynamic assessments and classifications for delivering adaptive recommendations within a specific context. In some aspects, Integration Process 618 also communicates to back-end data processing system 130: (a) input data records 602'; (b) target outcomes 606'; and/or (c) suggested communication markers 608'. Thus, a set of integrated information 618' is communicated by Integration Process 618 to back-end data processing system 130 for further processing in accordance with methods for dynamic assessments, classifications, and delivery of adaptive recommendations as described herein.

In this aspect, integrated information 618' is communicated from Integration Process 618 to back-end application software 131, which in turn maps integration information 618' into a one or more back-end data structures, such as data structure 136, for a given use case (e.g. educational coaching) represented by input data records 602' and target outcomes 606'. Thus, the above-described processes of data processing system 600 may be used to perform, for a given use case, a method for (a) identifying the set of one or more outcomes 136*a* (e.g., target outcomes 606'); (b) identifying the set of one or more dimensions 136*b* (e.g., mapped dimensions 610'); (c) identifying the set of possible assessment categories 136*c* (e.g. indexed dimension assessment categories 616) for each dimension in the set of dimensions 136*b*; (d) identifying a plurality of persona classifications 138 (e.g., indexed persona classifications 617) relating to the set of dimensions 136*b* and the set of possible assessment categories 136*c*; and (e) integrating, in a data structure 136, the set of one or more dimensions 136*b*, the set of possible assessment categories 136*c*, and the plurality of persona classifications 138. In this aspect, the method further includes: (f) identifying the plurality of recommendations 137 (e.g., indexed recommendations 615); and (g) integrating the plurality of recommendations 137 in data structure 136.

In some aspects, data processing system 600, as exemplified in FIG. 6, performs processes 602, 606, 608, 610, 614, and 618 using a system distinct and separate from the system depicted in FIG. 1A and the processes shown, for example, in FIG. 2.

4. Hardware

The techniques described above can be implemented as computer software using computer-readable instructions and physically stored in one or more computer-readable media, as, for example, in a computer system suitable for implementing certain aspects of the disclosed subject matter. The computer system includes one or more input devices (for example, keyboard, microphone, mouse, touch screen, touch pad, graphical user hardware interface, digital pen, etc.), one or more output devices (visual output display, audio output device, etc.) a computer processor, and one or more storage devices.

Figure 7A:
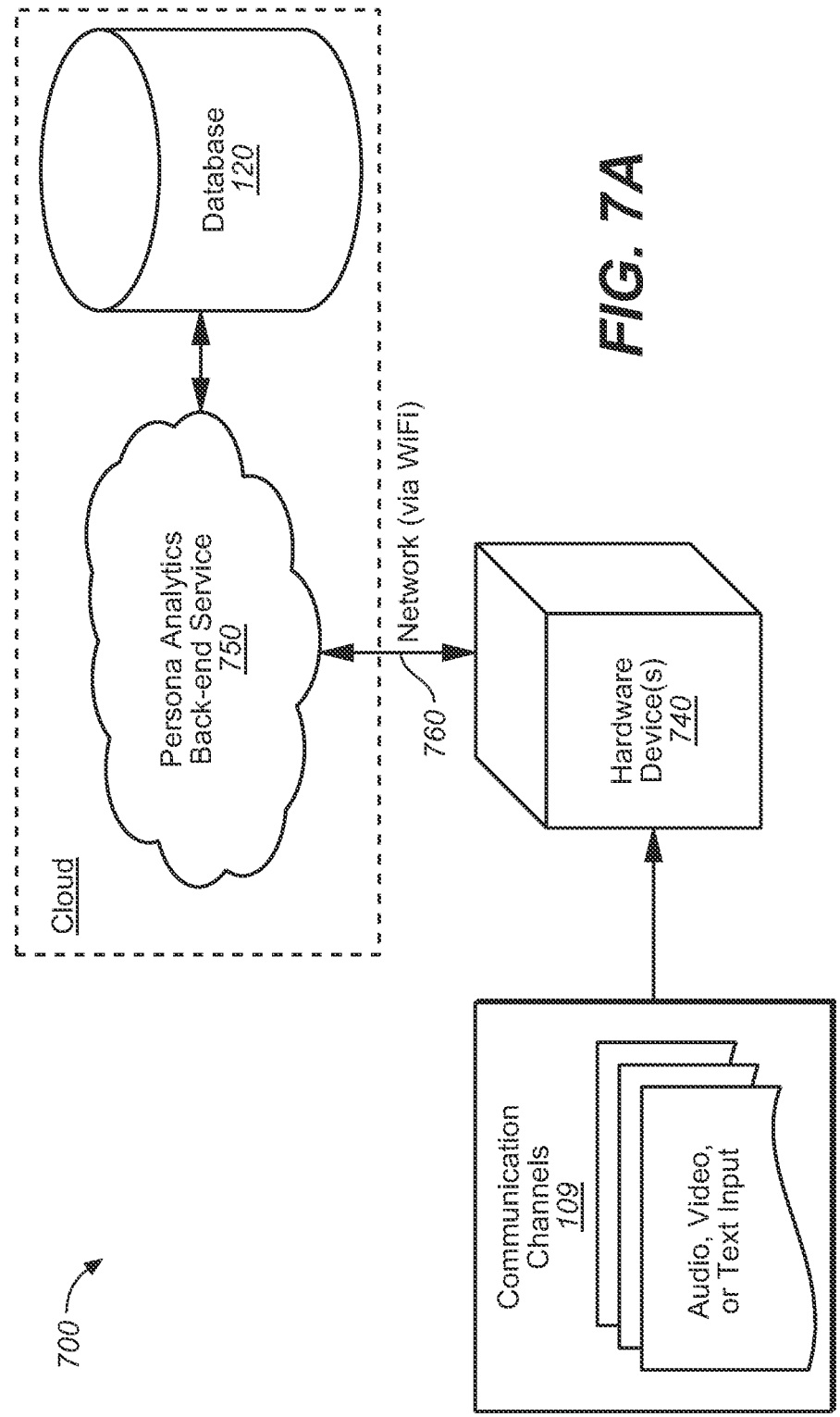
FIGS. 7A and 7B shows schematics for a computer system suitable for implementing aspects of the disclosed subject matter.
Figure 7B:
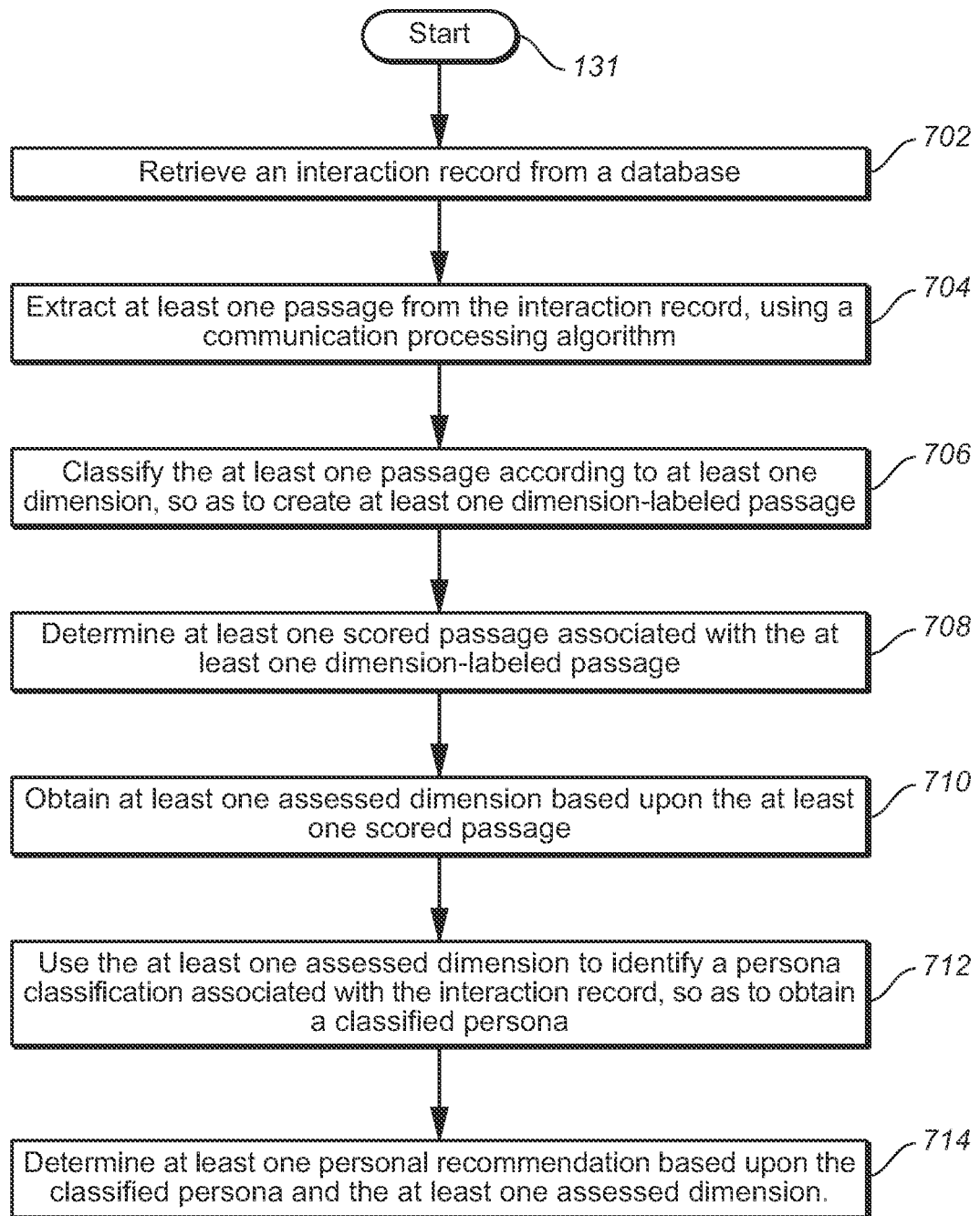

FIGS. 7A and 7B provide an overview of one aspect of a data processing system 700 used to implement the methods described herein, comprising:

Communication Channels 109: In some aspects, natural language is captured by one or more hardware devices 740 through speech (audio data), video (audio data and video data), or written text (text data), by an individual and/or representative.

Hardware Device(s) 740: The physical apparatus(es) housing both hardware and software components. Hardware device(s) 740 may include, for example: computer systems, local data storage, software applications, microphone, speaker, camera, display screen, text input device, and Internet connectivity.

Persona Analytics Back-End Service 750: The back-end application software 131 hosted via a back-end server/cloud computing and accessed by hardware device(s) 740 through a network connection 760.

Database 120: The repository hosted via cloud computing that acts as long-term storage for data captured through the hardware device(s) 740 (or other input sources) and processed through the persona analytics back-end service 750.

Computer software described herein can be coded using any suitable machine code or computer language (e.g., Python, Java, PHP, JavaScript, Ruby) that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like. The instructions can be executed on various types of computers or components thereof, including, for example, desktop computers, laptop computers, tablets, smartphones or other mobile devices, distributed back-end computer systems; etc.

The components shown in FIG. 7A for data processing system 700 are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary implementation of a computer system for the subject matter described herein.

For example, hardware components may include: (1) a stand-alone laptop or desktop computer device for use by representatives; (2) a stand-alone device for individual self-service; (3) a mobile phone, tablet or device executing a software application installed thereon; and/or (4) a system developed, hosted, and run on local computer systems, or through on-demand cloud computing systems.

A data processing system for implementing certain aspects of the described subject matter may include certain human interface input devices responsive to input by one or more human users; it may also include certain human interface output devices. A suitable data processing system for implementing aspects of the described subject matter can also include an interface to one or more communication networks. The computer readable media can have computer code thereon for performing various computer-implemented operations. The media and computer code can be those specially designed and constructed for the purposes of the present disclosure, or they can be of the kind well known and available to those having skill in the computer software arts. The present disclosure encompasses any suitable combination of hardware and software for implementing aspects of the subject matter described herein.

FIG. 7B shows an exemplary algorithm executed by persona analytics back-end service 750 of data processing system 700 in some aspects of the present subject matter. In this aspect, persona analytics back-end service 750 comprises a data processing system operable to:

(step 702): retrieve an interaction record from a database;
(step 704): extract at least one passage from the interaction record, using a communication processing algorithm;
(step 706): classify the at least one passage according to at least one dimension, so as to create at least one dimension-labeled passage;
(step 708): determine at least one scored passage associated with the at least one dimension-labeled passage;
(step 710): obtain at least one assessed dimension based upon the at least one scored passage;
(step 712): use the at least one assessed dimension to identify a persona classification associated with the interaction record, so as to obtain a classified persona; and
(step 714): determine at least one personal recommendation based upon the classified persona and the at least one assessed dimension.

5. Competitive Advantages and Other Improvements Over Prior Systems and Methods

One general aspect of the system and method described herein includes selecting dimensions correlated with an outcome (so they can be influenced), and using natural language to make assessments (rather than or in addition to a traditional survey instrument or structured interview). Aspects of the system and method may also include:

Averaging scored passages within a dimension, in order to assess the dimension for each individual Leveraging an assessment of each dimension to classify the individual into a persona Leveraging assessed dimension(s) to provide intervention recommendations Generating assessments dynamically over time as new data becomes available Applying recommended interventions over time to improve success rate for attaining (or avoiding) a defined outcome Using collective persona analytics information to understand trends within a given population The system and method described herein uses one or more natural language processing algorithms to process natural language expression from a set of communication interaction records 110. The system and method does not rely on survey instruments and/or structured variables (such as demographics) in order to create an assessment and designate a persona, thereby avoiding such onerous tasks for individuals seeking to assess a dimension or identify a persona.

Unlike products that are executed only once (like a personality quiz), the present system and method runs dynamically over time, so that an understanding of an individual is current and adaptive, which improves the efficiency and relevance of intervention recommendations to be provided to that individual and/or delivered to a representative. The system and method described herein employs open-ended interactions between a representative and an individual which emerge organically over time while discussing outcomes and/or goals.

The present system and method reduces human factor errors (e.g. lost information due to imperfect memory), in that interactions are captured and included in a comprehensive corpus of data to be assessed for an individual, and thus effectively avoids reliance on any prior, point-in-time assessments or previous summary notes (and human memory) alone, in order to make a current and accurate assessment and corresponding support plan.

The present system and method improves upon known, aspect-based sentiment analysis methods—first, by defining which dimensions are consequential to an outcome, and second, by then using a set of those defined dimensions to identify a persona classification that accurately represents an individual. The system and method is thus capable of going beyond merely creating a collection of attributes from which one attempts to determine an individual's sentiment. As used herein, the phrase "a set of" means "one or more."

The present system and method connects a recommendation directly to an assessment that has been made for each dimension, to create a comprehensive, personalized and adaptive plan; this functional aspect goes well-beyond merely giving recommendations based on what other individuals like you do, or buy, or watch.

The system, methodology, and technology described herein make personalized and effective service delivery feasible at large scale, and is extensible across many different industries.

The system and method described herein creates a new way to assess and evaluate the needs, behaviors, and obstacles of individuals seeking and/or subject to similar outcomes within a population, as well as what interventions help them overcome barriers to success in achieving goals. The system and method dynamically updates with new interactions between representative and individual, or as other pertinent information becomes available, which means that assessments and classifications are repeated over time, as information changes, and are always up-to-date. This also means that personalized intervention recommendations are adaptive to an individual over time, which is not possible through existing manual methods of assessment and recommendations.

Better results, more satisfied individuals, improved reliability, and lower cost are identifiable benefits and improvements that derive from using the system and method described herein.

Figure 8:
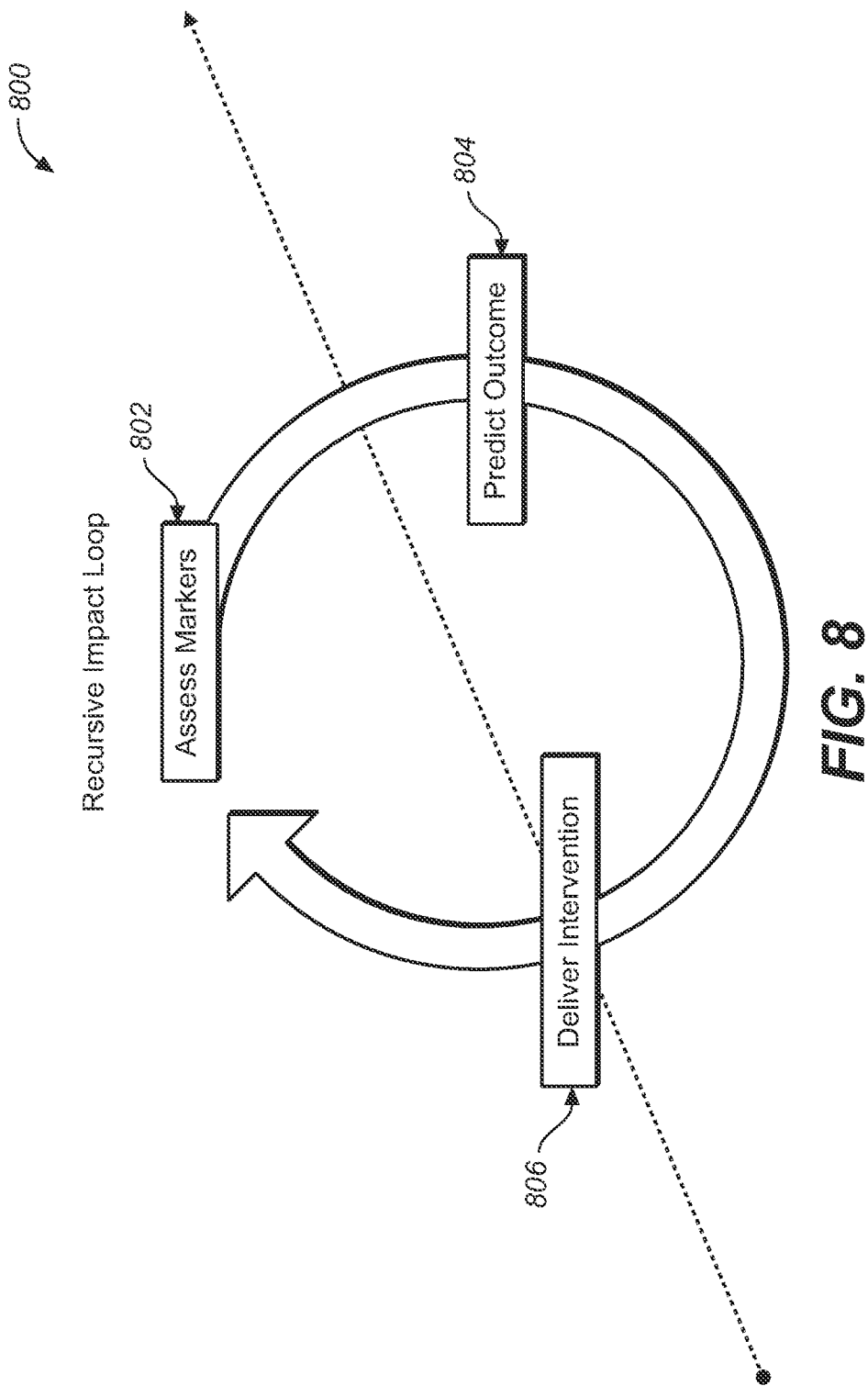
FIG. 8 generally depicts an exemplary recursive impact loop in one aspect of the method described herein.

6. Use Case: Delivering Adaptive Personalized Recommendations in Higher Education Coaching FIG. 8 generally depicts an exemplary recursive impact loop in one aspect of the method described herein. As shown in FIG. 8, Recursive Impact Loop 800 comprises three stages are represented: (1) Assessed Markers Stage 802 identifies assessed markers 608' based on communication interaction records 110 captured across communication channels 109; (2) Predict Outcome Stage 804 predicts one or more target outcomes 606' based on, for example, historical behavior for those with similar assessed dimensions and classified personas; and (3) Deliver Intervention Stage 806 delivers a personalized recommendation 145 (e.g., an intervention) based upon assessed dimensions 140, classified persona 142, and set of personal recommendations 143.

As an illustrative example, the system and method described herein may be used to assess and evaluate the needs, behaviors, and obstacles of individuals seeking to return to college and complete a college degree.

Figures 9A, 9B:
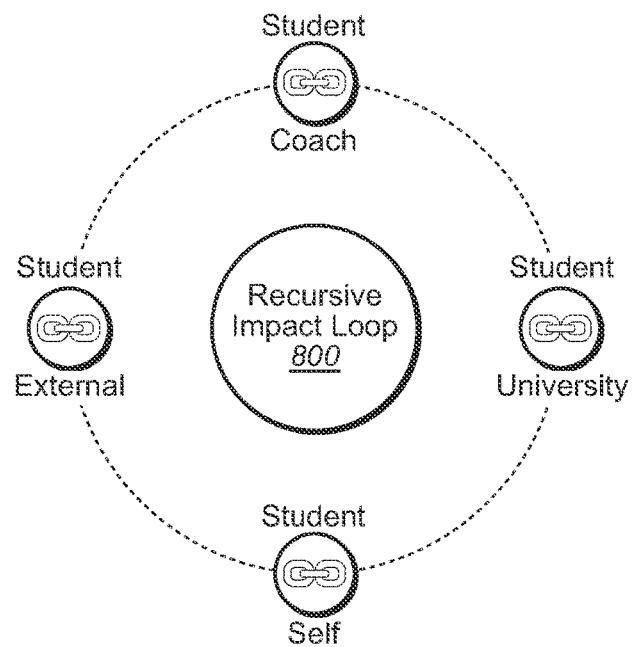

FIG. 9A depicts one exemplary coaching model that focuses on supporting the development of four key relationships in a student's life which may enable or inhibit success in returning to school (the outcome) and completing a degree. In this use case, these relationships are referred to as "Spheres" (dimensions), each of which may be evaluated on an ongoing basis to inform service delivery. For example, referring to FIG. 9A and with respect to a Student:

"Self" refers to a student's relationship with themselves
"University" refers to a student's relationship with their school
"External" refers to a student's relationships outside of school—including family, friends, and work
"Coach" refers to a student's relationship with their success coach (representative)

Dimensions are based on relationships in students' lives which can impact success in returning to and completing college or some other educational objective. Thus, for the educational re-entry use case:

FIG. 9B shows exemplary inhibiting and enabling dualities identified within each "sphere" (dimension) of an education re-entry use case having the four dimensions, as shown in FIG. 9A. (See also, generally, FIG. 3A.)

FIG. 9C shows an exemplary table enumerating sixteen possible student personas, based upon the dimensions and dualities shown in FIGS. 9A and 9B, respectively. (See also, generally, FIG. 3B.) In this particular implementation, the system and method described herein is capable of (1) dynamically assessing relevant coach-student interactions over time; (2) automatically classifying each individual student into one of the sixteen personas shown in FIG. 9C; and (3) adaptively recommending optimal, research-based, personalized interventions and support strategies, dynamically for each individual student being coached. For example, in this use case, an exemplary set of interventions may include:

An intervention to address identified low feelings of academic competence (Academic Competence-Building Narrative Intervention);

An intervention to address concerns about one's ability to plan, manage, and stay on top of their academic goals (Mental Contrasting With Implementation Intentions Intervention)

An intervention to address concerns about the personal time-and-effort costs of returning to school (Perceived Time-And-Effort Cost Reduction Intervention)

An intervention to address a subjective belief that their level of intelligence or academic ability is fixed (Growth Mindset Intervention)

An intervention to address concerns that they will be judged based on their social identities (Value Affirmation Intervention An intervention to address concerns about belonging at college (Social Belonging Intervention).

FIG. 9D shows a grid depicting the same sixteen possible student personas of FIG. 9C, in a format effectively highlighting certain enabling/inhibiting dualities, as identified in FIG. 9B.

FIGS. 9A, 9B, 9C and 9B are only exemplary; any number of dimensions 136b, each having any number of possible assessment categories 136c may be used. The total number or persona classifications 138 possible would then be based upon the total number of possible permutations for assessment categorie(s) 136c. More generally, in this aspect, dimensions are identified and correlated with desired outcomes or goals. A student's individual circumstances and goals may change over time. The dynamic assessments and adaptive aspects of the personalized intervention recommendations delivered by the system and method described herein effectively accommodates for such fluidity of context.

As another example implementation of this use case involving only one dimension, the following information is first identified:

Outcome: Re-enrollment in an educational program.
Dimension(s): Self.
Interventions: 1. If "Self"=Null, then discover information by asking questions so that the dimension can be assessed.
2. If "Self"=Low, then use a "growth mindset" intervention to educate the individual on the new concept of "growth mindset."
3. If "Self"=Medium, then practice the new concept of "growth mindset" repeatedly to create progress towards the Outcome.
4. If "Self"=High (once the individual's mindset has shifted), then reinforce the change for permanent effect towards achieving the Outcome.

Using a machine learning, natural language processing algorithm facilitates dynamic assessments of dimensions relevant to student success, improving upon prior methods that use a traditional survey instrument and/or structured interview process. In this use case example, averaging scored passages within a dimension are used to assess each dimension for an individual student. An assessed dimension is then used to classify the individual student into a persona. Assessed dimension(s) is (are) used to deliver intervention recommendations to the educational coach, who in turn uses them to advise the individual student.

Generating assessments dynamically over time, as new data becomes available, is also implemented in this use case. The educational coach applies the recommended interventions over time, to improve success rate for a student's desired outcome/goal. Accessing and using collective persona analytics information to visualize and evaluate trends over time within a given population is also implemented in this use case example.

Appendix 1

Example Development Guide for One Aspect (Illustrated in FIG. 2) wherein Personal Recommendations are Interventions in an Educational Re-Entry Context
- a. Transcription
  - i. Inputs: Voice Recordings (Audio Files), Voice Metadata
  - ii. Outputs: Transcribed Text
  - iii. Process: There are many approaches to speech transcription. The state-of-the-art here is to use pre-trained deep neural networks capable of receiving as input sequences of raw auditory data and predicting as output transcribed character or word-level text. In our case, we used an external transcription service (API) provided by Google.
- b. Speaker Diarization
  - i. Inputs: Transcribed Text and/or Voice Recordings (Audio Files)
  - ii. Outputs: Diarized Text (i.e., conversational turn, associated with a distinct speaker, e.g., a first speaker vs. a second speaker)
  - iii. Process: Diarization is most effectively done in tandem with transcription because it is possible to use signals in voices (e.g., their prosody and speaker-variant acoustics) to count and identify speakers. We used this technique with Transcription above. However, it is also possible to feed in transcribed text and have it be diarized after the fact.
- c. Speaker Identification
  - i. Inputs: Diarized Text
  - ii. Outputs: Speaker Labeled Text e.g. [(Representative (coach), Individual (student)]
  - iii. Process: We used weakly supervised learning to build a convolutional neural network (CNN) capable of receiving text and predicting a speaker label. This network was trained on several thousand examples of text from both Individuals (students) and Representatives (coaches). These examples were "weakly" supervised, meaning that we used human labeling alongside automated labeling rules to label most examples (e.g., if they mention the business name, "ReUp"→label as Representative (coach); if they mention "my grades-"→label as Individual (student)). This CNN operated over word-embeddings (mapping a word to a numeric vector of a constant length).
- d. Text Preprocessing
  - i. Inputs: Raw Speaker Labeled Text
  - ii. Outputs: Processed Speaker Labeled Text
  - iii. Process: During research, we found that cleaning up the text prior to submitting it to downstream classifiers improved performance. In this step, we use regular expressions and basic text manipulation to "clean up" the text, including stripping any email and SMS metadata that is part of the text body, removing other form text that is not unique per student response, lowercasing, forcing spaces around emojis, removing reduplicated whitespace, removing URLs, removing phone numbers, removing Twitter mentions/hashtags, removing previous email replies, and removing signatures.
- e. Passage Segmentation
  - i. Inputs: Processed Speaker Labeled Text from a voice interaction (e.g., phone calls) or text interaction (e.g., email, sms, forms)
  - ii. Outputs: Segmented Passages from an interaction, representing a specific phrase
  - iii. Process: We use a pre-trained sentence segmentation model from SpaCy to perform this step. It uses a dependency parser to first build a syntactic structure for the text input. It then analyzes the syntactic structure to segment separable phrases (e.g., "I like cookies and I like dogs" becomes a first sentence, "I like cookies" and a second sentence, "and I like dogs").
- f. Dimension Labeling
  - i. Inputs: Segmented Passages
  - ii. Outputs: Passages with 1+ dimension labels
  - iii. Process: We used a fully-supervised learning approach to build a deep neural network that could predict whether a sentence was relevant to one or more of the selected dimensions. This network was trained on a dataset of thousands of sentences labeled with 0+ of the dimensions. The network used bidirectional sentence representations and was a fine-tuned version of DistilBERT, a (smaller) distillation of Google's state-of-the-art BERT model. Note that most sentences are not predicted to belong to any dimension, and are dropped after this process.
- g. Passage Scoring/Dimension Scoring
  - i. Inputs: Passages with 1+ dimensions
  - ii. Outputs: Passages with scores for each classified dimension
  - iii. Process: Once determining that a passage relates to a dimension, we "score" it for that dimension on a range from −1 (inhibiting success) to +1 (enabling success). To do so, we pass the sentence text and its dimension label to another fine-tuned DistilBERT network which predicts the score from a −1 to 1 range. This network was trained on the same dataset as the passage dimension classifier (used in the previous step). However, rather than have a single record with many labels for each of the dimensions, this dataset had a record for each passage and labeled dimension combination along with its score on that dimension. For example, the sentence "I don't think I can return to school because my family would rather I work full-time at the family business" would appear twice in the dataset, once with the dimension label EXTERNAL-FAMILY and a score of −1, and another instance with a label EXTERNAL-WORK and a score of −1.
- h. Persona Analysis
  - i. Inputs: Passages with scored dimensions, interaction metadata
  - ii. Outputs: Aggregated dimension scores, dimension labels, persona classifications
  - iii. Process: The goal of this step is to summarize the data extracted in the previous steps to form a single coherent snapshot of the individual based on their prior interactions. For most of the selected dimensions, this means calculating summary statistics of their scores for passages in each dimension. For example, someone who has had 3 sentences about dimension X scored as [−1, −0.5, 0] may receive a dimension score of −0.5. For other dimensions, we also integrate raw metadata of the interactions; e.g., we look at the ratio of interaction turns attributable to the individual (student) vs. representative (coach) to establish a score for the "Coach" dimension. When dimensions are broken down into sub-dimensions (e.g., "External" is analyzed as "External-Family", "External-Work", and "External-Friends"), sub-dimension scores are aggregated into their parent dimension. (While many approaches to calculating the aggregate dimensions scores are viable, using an exponential moving average is selected here, which creates improved dynamic results over time. We then discretize the dimension scores into a single label; e.g., a score less than −0.1 on a dimension would translate to an "inhibiting" label for that dimension. Finally, we summarize the individual's (student's) persona in several ways. First, we assign a single persona label by aggregating labeled dimensions (each combination of discretized dimension labels maps to a unique, overall label which can be considered the persona's "name", and is matched from an index of all labels stored in the database). Second, we derive secondary metrics from the persona, such as an "Overall Health" or "Health Quotient" metric calculated as the proportion of dimensions on which the individual (student) is deemed "enabled" with a score greater than or equal to 0.
i. Database
i. This database stores the results of the final process as well as all of the intermediary steps, such that they can be analyzed and visualized later. This includes:
1. Interaction metadata
2. Diarized, transcribed voice transcriptions
3. Preprocessed text
4. Segmented sentences with labels and scores
5. Timestamped outputs of each persona analysis
j. Pipelining
i. Because of the computational requirements of the components in this pipeline, and the scale of input data, these pipelines were incorporated into a parallel processing pipeline operating over mini-batches of players. These mini-batches are processed separately and in parallel on as many cores as are available on the machine. This has the benefit of speed and also makes the system more robust to failures because a single failure in one batch does not catastrophically terminate all processing.
k. Interventions/Personal Recommendations
i. Personas and their underlying persona dimension labels can be used to recommend optimal interventions or actions. The matching of intervention/personal recommendation to persona can be facilitated in several ways, such as by storing the specific intervention details (or sets of interventions) in a table within the database with a column containing the corresponding dimension and score threshold for each intervention row. This allows the interventions to be readily associated with each assessment for each individual based on the score of each dimension. For example, if an individual scored notably 'low' on a dimension and it was established that intervention X could facilitate increasing their health in that dimension, an optimal system would recommend intervention X automatically for that individual.
ii. In the present application, recommended interventions are based on the automated analysis of the persona dimension scores (from −1 to 1 on each persona dimension). For each dimension scoring less than 0, the system draws a recommended intervention from a set of interventions shown to empirically assist in improving one's health on that dimension. For example, if an individual (student) scored low on the "EXTERNAL-FAMILY" dimension, they would be recommended one of several interventions designed to help students deal with negative family influences on returning to school.
iii. Recommended interventions that are delivered to a student are then stored in the database as new interaction records, so that the efficacy of the interventions can be continuously re-evaluated through future dimension scores and long term outcomes. In the case of this example student, the system would automatically be able to measure the efficacy of the intervention by monitoring the subsequent change in their "EXTERNAL-FAMILY" dimension score once the intervention had been delivered. By analyzing the effect of the intervention on many individual's dimension scores, the recommendations can be improved over time by selecting those with the highest predictive impact on dimension scores and outcomes.

We claim:

1. A data processing system to classify dynamically from a communication interaction record a persona and facilitate delivery of a personalized recommendation associated with the persona, the data processing system comprising:
a database operable to store, (a) in a stored communication interaction record, at least one communication interaction record captured from an individual through at least one communication channel, and (b) a set of dimensions correlated with an outcome;
a computer processor informationally coupled to the database and operable to identify a persona classification relating to the set of dimensions and the at least one communication interaction record, using a communication processing algorithm to assess at least one dimension in the set of dimensions and obtain at least one assessed dimension and a classified persona associated with the individual, the stored communication interaction record, and the outcome;
generate at least one personal recommendation associated with the classified persona, and
store in the database the at least one personal recommendation, the at least one assessed dimension, and the classified persona in a set of persona analytics information associated with the individual and the stored communication interaction record; and
an output hardware device informationally coupled to the computer processor and the database, and operable to present information relating to the set of persona analytics information associated with the individual and the stored communication interaction record.

2. The data processing system of claim 1, wherein the communication processing algorithm comprises a natural language processing algorithm.

3. The data processing system of claim 1, wherein the stored communication interaction record comprises nonverbal communication information.

4. The data processing system of claim 3, wherein the nonverbal communication information comprises form submissions.

5. The data processing system of claim 1, wherein the at least one personal recommendation comprises an intervention recommendation.

6. The data processing system of claim 1, wherein the output hardware device comprises a graphical user interface.

7. The data processing system of claim 1, wherein the set of persona analytics information comprises is stored in a collection of persona analytics information and collectively accessed to evaluate a trend.

8. The data processing system of claim 1, wherein the set of persona analytics information is adaptive to the individual.

9. A data processing system to determine a personal recommendation, the data processing system comprising:
a computer-readable storage medium having a non-transitory computer readable program stored therein, wherein the non-transitory computer readable program, when executed on a computing device of the data processing system, causes the computing device to:
retrieve a stored interaction record from a database;
extract at least one passage from the stored interaction record, using a natural language processing algorithm;
classify the at least one passage according to at least one dimension correlated with an outcome, so as to create at least one dimension-labeled passage;
determine at least one scored passage associated with the at least one dimension-labeled passage;
obtain at least one assessed dimension based upon the at least one scored passage;
use the at least one assessed dimension to identify a persona classification associated with the stored interaction record and an individual, so as to obtain a classified persona for the individual and relating to the outcome; and
determine at least one personal recommendation relating to the outcome, based upon the classified persona and the at least one assessed dimension.

10. The data processing system of claim 9, further comprising an application programming interface operable to provide a graphical user interface to a user of the data processing system, so as to facilitate delivery of the at least one personal recommendation.

11. The data processing system of claim 9, wherein the stored interaction record comprises nonverbal communication information.

12. The data processing system of claim 11, wherein the nonverbal communication information comprises form submissions.

13. The data processing system of claim 9, wherein the at least one personal recommendation is adaptive to an individual.

14. A method for delivering a personalized intervention recommendation relating to an identified outcome using dynamic assessment and persona classification, the method comprising:
defining, in a data processing system, a set of dimensions correlated with an outcome, wherein the data processing system comprises a database comprising a set of stored communication interaction records captured from an individual;
defining, in the data processing system, a plurality of recommendations relating to the set of dimensions and the outcome;
retrieving, in the data processing system, an interaction record from the set of stored communication interaction records;
extracting, in the data processing system, a set of passages from the interaction record using a communication processing algorithm;
classifying, in the data processing system, the set of passages according to the set of dimensions, to create at least one dimension-labeled passage;
determining, in the data processing system, a scored passage associated with the at least one dimension-labeled passage;
obtaining, in the data processing system, at least one assessed dimension based upon the scored passage;
using, in the data processing system, the at least one assessed dimension to identify a persona classification associated with the interaction record, so as to obtain a classified persona for the individual;
matching, in the data processing system, the at least one assessed dimension to at least one intervention recommendation identified from the plurality of recommendations and based upon the classified persona;
storing, in the database, the classified persona, the at least one intervention recommendation, the at least one assessed dimension, and the outcome, so as to update a set of persona analytics information associated with the interaction record and the individual; and
communicating information from the set of persona analytics information to an output hardware device of the data processing system.

15. The method of claim 14, wherein the steps of retrieving, extracting, labeling, determining, obtaining, using, matching and storing are repeated dynamically over time.

16. The method of claim 14, wherein the communication processing algorithm comprises a natural language processing algorithm.

17. The method of claim 16, wherein the set of stored communication interaction records comprises data selected from a group consisting of audio data, video data, text data, and any combination thereof.

18. The method of claim 14, wherein the at least one intervention recommendation relates to delivering personalized support.

19. The method of claim 14, wherein the set of persona analytics information is stored in a collection of persona analytics information and collectively accessed to evaluate a trend.

20. The method of claim 14, further comprising:
identifying a set of outcomes, wherein the set of outcomes comprises the outcome;
identifying the set of dimensions;
identifying a set of possible assessment categories for each dimension in the set of dimensions;
identifying a plurality of persona classifications relating to the set of dimensions and the set of possible assessment categories; and
integrating, in a data structure, the set of outcomes, the set of dimensions, the set of possible assessment categories, and the plurality of persona classifications.

21. The method of claim 20, further comprising:
identifying the plurality of recommendations; and
integrating the plurality of recommendations in the data structure.

22. The method of claim 21, wherein identifying and integrating are performed by a second data processing system.

23. A non-transitory computer readable program which, when executed on a computing device of a data processing system, causes the computing device to:
retrieve an interaction record from a database;
extract at least one passage from the interaction record, using a communication processing algorithm;
classify the at least one passage according to at least one dimension, so as to create at least one dimension-labeled passage;

determine at least one scored passage associated with the at least one dimension-labeled passage;

obtain at least one assessed dimension based upon the at least one scored passage;

use the at least one assessed dimension to identify a persona classification of an individual associated with the interaction record; and determine at least one personal recommendation from a plurality of recommendations relating to an outcome, based upon the persona classification and the at least one assessed dimension.

24. The non-transitory computer readable program of claim 23, further comprising an application programming interface operable to provide a graphical user interface to a user of the data processing system.

25. The non-transitory computer readable program of claim 23, wherein the communication processing algorithm is a natural language processing algorithm.

\* \* \* \* \*